United States Patent
Gulwani et al.

(10) Patent No.: US 9,098,191 B2
(45) Date of Patent: Aug. 4, 2015

(54) SKETCH BEAUTIFICATION AND COMPLETION OF PARTIAL STRUCTURED-DRAWINGS

(75) Inventors: Sumit Gulwani, Redmond, WA (US); Salman Shaukat Cheema, Orlando, FL (US); Joseph J. LaViola, Jr., Oviedo, FL (US)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 13/357,612

(22) Filed: Jan. 24, 2012

(65) Prior Publication Data
US 2013/0188877 A1    Jul. 25, 2013

(51) Int. Cl.
*G06K 9/46* (2006.01)
*G06F 3/0488* (2013.01)

(52) U.S. Cl.
CPC .................................. *G06F 3/04883* (2013.01)

(58) Field of Classification Search
CPC .......... G06F 3/04883; G06F 17/30247; G06F 3/04845; G06K 9/00476; G06K 9/222; G06K 9/00402; G06K 9/00416
USPC .......... 382/181, 182, 186, 187, 195, 202, 203
See application file for complete search history.

(56) References Cited

U.S. PATENT DOCUMENTS

| | | | |
|---|---|---|---|
| 6,097,392 A * | 8/2000 | Leyerle | 715/863 |
| 7,233,699 B2 * | 6/2007 | Wenzel et al. | 382/209 |
| 7,515,752 B2 | 4/2009 | Tremblay et al. | |
| 2002/0141643 A1 | 10/2002 | Jaeger | |
| 2004/0037463 A1 | 2/2004 | Calhoun et al. | |
| 2006/0227140 A1 * | 10/2006 | Ramani et al. | 345/441 |
| 2010/0092093 A1 * | 4/2010 | Akatsuka et al. | 382/203 |
| 2010/0195914 A1 * | 8/2010 | Isard et al. | 382/201 |

OTHER PUBLICATIONS

Hammond, Tracy, "Enabling Instructors to Develop Sketch Recognition Applications for the Classroom," 37th Annual 2 ASEE/IEEE Frontiers in Education Conference—Global Engineering: Knowledge Without Borders, Opportunities [] Without Passports, Oct. 2007, pp. S3J-11 to S3J-16.*

Aldefeld, B., "Variation of Geometries Based on a Geometric-reasoning Method," Computer Aided Design, vol. 20, No. 3, Apr. 1988, pp. 117-126.

Bouma, et al., "Geometric Constraint Solver," Computer-Aided Design, vol. 27, No. 6, 1995, p. 487-501.

(Continued)

*Primary Examiner* — Kim Vu
*Assistant Examiner* — Michael Vanchy, Jr.
(74) *Attorney, Agent, or Firm* — Micah Goldsmith; Judy Yee; Micky Minhas

(57) ABSTRACT

A sketch processing system is described herein for assisting a user in producing a drawing. In one implementation, the sketch processing system operates by: receiving ink strokes in response to creation of an original drawing; recognizing components and geometric constraints within the original drawing, to produce a recognized drawing; beautifying the original drawing by modifying at least one aspect of the recognized drawing in accordance with the recognized constraints, to produce a beautified drawing; and recognizing a recurring pattern in the beautified pattern (if any) and using that pattern to produce at least one added component to the beautified drawing.

20 Claims, 20 Drawing Sheets

(56) References Cited

OTHER PUBLICATIONS

Cabri II Plus home page, retrieved at <<http://www.cabri.com/new-cabri-2-plus.html>>, retrieved on Jan. 20, 2012, CABRILOG SAS, Grenoble, France, 1 page.
Chin, et la., "Development of an Instrument Measuring User Satisfaction of the Human-Computer Interface," retrieved at <<http://acm.org>>, Proceedings of the SIGCHI Conference on Human Factors in Computing Systems, 1988, pp. 213-218.
Forbus, et al., "Cogsketch: Sketch Understanding for Cognitive Science Research and for Education," Topics in Cognitive Science, 2011.
Geometer's Sketchpad home page, retrieved at <<http://dynamicgeometry.com/>>, retrieved on Nov. 22, 2011, KCP Technologies, Inc., Emeryville, CA, 2 pages.
Geometry Expressions home page, retrieved at <<http://www.geometryexpressions.com/>>, retrieved on Jan. 20, 2012, Saltire Software, Tigard, OR, 3 pages.
Gulwani, et al., "Synthesizing Geometry Constructions," retrieved at <<http://acm.org>>, Proceedings of the 32nd ACM SIGPLAN Conference on Programming Language Design and Implementation, PLDI '11, Jun. 2011, pp. 50-61.
Hammond, et al., "Ladder, a sketching language for user interface developers," retrieved at <<http://rationale.csail.mit.edu/publications/Hammond2005Ladder.pdf>>, Computers and Graphics, vol. 29, No. 4, 2005, pp. 518-532.
Igarashi, et al., "Interactive Beautification: A Technique for Rapid Geometric Design," retrieved at <<http://acm.org>>, Proceedings of the 10th Annual ACM Symposium on User interface Software and Technology, UIST '97, 1997, pp. 105-114.
Jiang, et al., "Intelligent Understanding of Handwritten Geometry Theorem Proving," retrieved at <<http://acm.org>>, Proceedings of the 15th International Conference on Intelligent User Interfaces, IUI '10, 2010, pp. 119-128.
Kondo, K., "Algebraic method for manipulation of dimensional relationships in geometric models," Computer-Aided Design, 24, 3, 1992, pp. 141-147.
LaViola, et al., "Mathpad2: A system for the creation and exploration of mathematical sketches," retrieved at <<http://acm.org>>, ACM Transactions on Graphics, Proceedings of ACM SIGGRAPH 2004, vol. 23, Issue 3, Aug. 2004, pp. 432-440.
Li, et al., "An intelligent interactive pen-based whiteboard for dynamic geometry teaching," First IEEE International Symposium on Information Technologies and Applications in Education, 2007, ISITAE '07, Nov. 2007, pp. 396-401.
Microsoft PowerPoint home page, retrieved at <<http://office.microsoft.com/en-us/powerpoint/>>, retrieved on Jan. 20, 2012, Microsoft Corporation, Redmond, WA, 1 page.
Nelson, Greg, "Juno, a constraint-based graphics system," retrieved at <<http://acm.org>>, ACM SIGGRAPH Computer Graphics, vol. 19, Issue 3, Jul. 1985, pp. 235-243.
Paulson, et al., "Paleosketch: Accurate Primitive Sketch Recognition and Beautification," retrieved at <<http://acm.org>>, Proceedings of the 13th International Conference on Intelligent User Interfaces, 2008, pp. 1-10.
Wais, et al., "Designing a Sketch Recognition Front-end: User Perception of Interface Elements," <<http://acm.org>>, Proceedings of the 4th Eurographics Workshop on Sketch-based Interfaces and Modeling, 2007, pp. 99-106.
Xiong, et al., "Technical section: A shortstraw-based algorithm for corner finding in sketch-based interfaces," retrieved at <<http://elsevier.com>>, Computers and Graphics, vol. 34, Oct. 2010, pp. 513-527.
Zelenik, et al., "Lineogrammer: Creating Diagrams by Drawing," retrieved at <<http://acm.org>>, Proceedings of the 21st Annual ACM Symposium on User Interface Software and Technology, 2008, pp. 161-170.
Geometry Expressions product manual, retrieved at <<http://www.geometryexpressions.com/>>, retrieved on Jan. 20, 2012, Saltire Software, Tigard, OR, 153 pages.
Plimmer, et al., "A toolkit approach to sketched diagram recognition," retrieved at <<acm.org>>, Proceedings of the 21st British HCI Group Annual Conference on People and Computers, 2007, pp. 205-213.
Fonesca, et al., "CALI : An Online Scribble Recognizer for Calligraphic Interfaces," retrieved at <<http://vimmi.inesc-id.pt/~mjf/publications/2004-1999/pdf/aaai02-cali.pdf>>, Neural Networks, 2002, 8 pages.
Gusaite, Milda, "Dynamic Scene Analysis and Beautification for Hand-drawn Sketches," retrieved at <<http://www.sfbtr8.uni-bremen.de/project/r1/theses/master_thesis_milda_gusaite.pdf>>, Masters Thesis, Kauno Technologijos Universitetas, Lithuania, 2006, 86 pages.
Alvarado, et al., "Resolving Ambiguities to Create a Natural Sketch Based Interface," retrieved at <<http://citeseerx.ist.psu.edu/viewdoc/download?doi=10.1.1.86.4269&rep=rep1&type=pdf>>, Proceedings of IJCAI, 2001, 18 pages.
Li, et al., "Sketch Recognition with Continuous Feedback Based on Incremental Intention extraction," retrieved at <<http://zxw.net9.org/zip/04%20Ink%20Documents/2005-01-Sketch%20Recognition%20with%20Continuous%20Feedback.pdf>>, Proceedings of the 10th International Conference on Intelligent User Interfaces, 2005, pp. 145-150.
Jiang, et al., "Structuring and Manipulating Hand-Drawn Concept Maps," retrieved at <<http://zhang.ist.psu.edu/pdf/p457-jiang.pdf>>, Proceedings of the 14th International Conference on Intelligent User Interfaces, 2009, pp. 457-461.
Cabri home page, retrieved at <<http://www.cabri.com/>>, retrieved on Nov. 22, 2011, CABRILOG SAS, Grenoble, France, 1 page.
International Search Report and Written Opinion for PCT/US2013/022331, mailed on Jun. 26, 2013, 11 pages.
Hammond, Tracy, "Enabling Instructors to Develop Sketch Recognition Applications for the Classroom," 37th Annual ASEE/IEEE Frontiers in Education Conference—Global Engineering: Knowledge Without Borders, Opportunities Without Passports, Oct. 2007, pp. S3J-11 to S3J-16.
Jenkins, et al., "Applying constraints to enforce users' intentions in free-hand 2-D sketches," Intelligent Systems Engineering, vol. 1, Issue 1, 1992, pp. 31-49.
Wang, et al., "On-line Sketch Recognition for Course of Action Diagrams," Proceedings of the 2010 IEEE International Conference on Mechatronics and Automation, Aug. 2010, pp. 465-469.
Hu, et al., "HMM Based On-Line Handwriting Recognition," IEEE Transactions on Pattern Analysis and Machine Intelligence, vol. 18, Issue 10, pp. 1039-1045.

\* cited by examiner

SKETCH BEAUTIFICATION AND COMPLETION OF PARTIAL STRUCTURED-DRAWINGS

BACKGROUND

A user may wish to create a drawing having precisely-rendered geometric shapes, as well as precisely-rendered arrangements of those shapes. In one approach, the user can produce the drawing "by hand" by sketching out the geometric figures on a graphics tablet or the like. However, it may be difficult for the user to produce a drawing in this manner with a satisfactory degree of precision.

The research community has proposed various ways of assisting a user in creating a precise drawing, some of which allow the user to convey his or her drawing-related intent by making an initial hand-drawn sketch of the drawing. There is nevertheless room for considerable improvement in such techniques.

SUMMARY

A sketch processing system (SPS) is described herein for assisting a user in producing a drawing. In one implementation, the SPS includes a recognition module for receiving ink strokes in response to creation of an original hand-drawn drawing. The recognition module then recognizes components (e.g., lines and circles) and geometric constraints within the original drawing, to produce a recognized drawing. The sketch processing system also includes a beautification module for producing a beautified drawing which cleanly expresses the geometric constraints recognized in the original drawing. The sketch processing system module also includes a pattern processing module for recognizing a predominant pattern in the beautified drawing (if any). The pattern processing module then uses that pattern to add at least one new component to the beautified drawing.

The recognition module, beautification module, and pattern processing module can be used in combination in the manner summarized above. In addition, these three components can be used separately in other environment-specific contexts.

According to another illustrative aspect, each component that is recognized by the recognition module can be further decomposed into two or more sub-components. The beautification module may then perform its operation by successively resolving unknown sub-components in the recognized drawing. Further, the pattern processing module may perform its operation by identifying transformations between different pairs of sub-components in the beautified drawing. This yields transformation information. The pattern processing module can then use a voting technique to identify one or more predominant transformations in the transformation information. These one or more predominant transformations correspond to a recurring pattern in the beautified drawing.

The above approach can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality for beautifying sketches and for completing partial structured-drawings. Section B describes illustrative methods which explain the operation of the functionality of Section A. Section C describes illustrative computing functionality that can be used to implement any aspect of the features described in Sections A and B.

Figure 20:
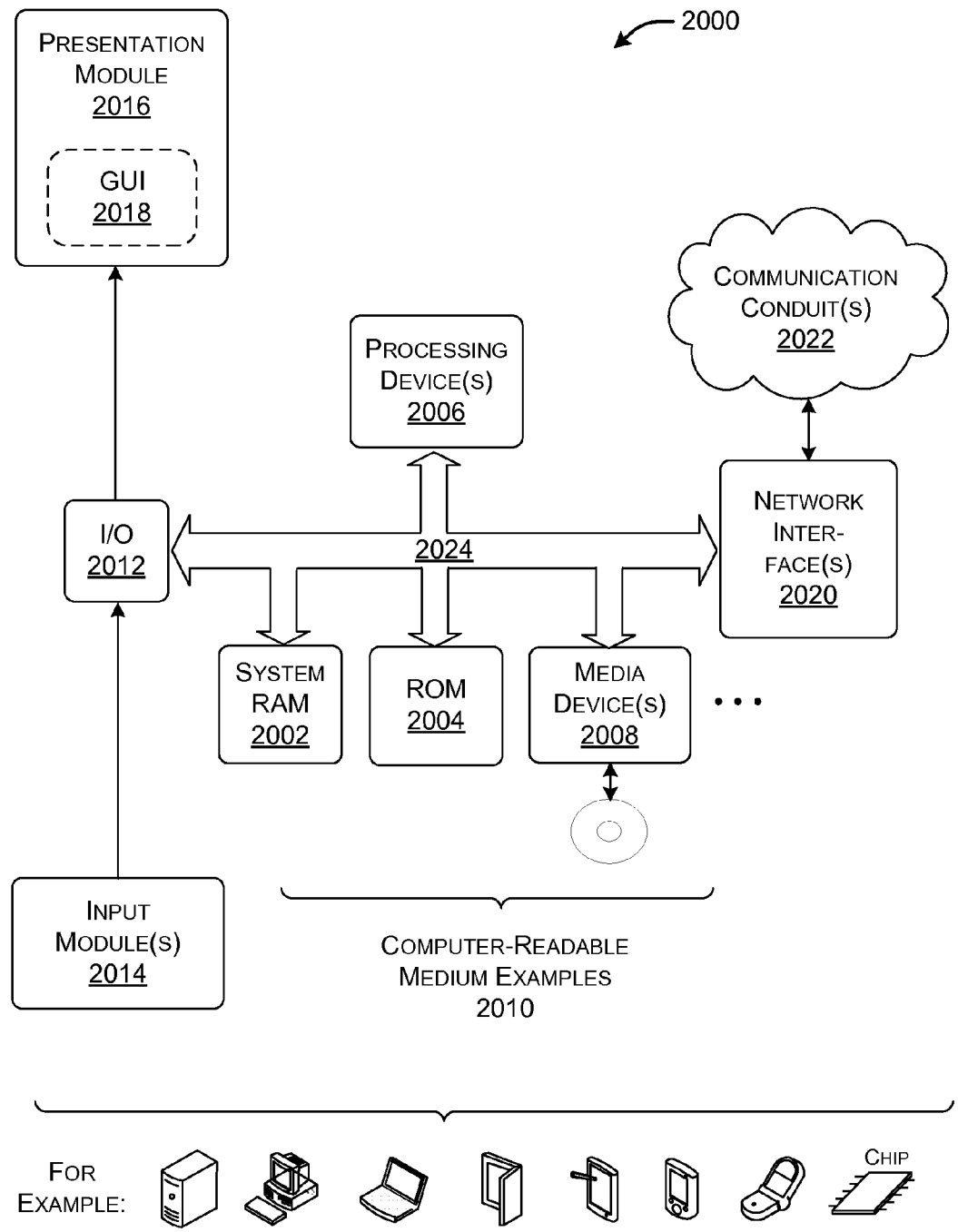
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 20, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
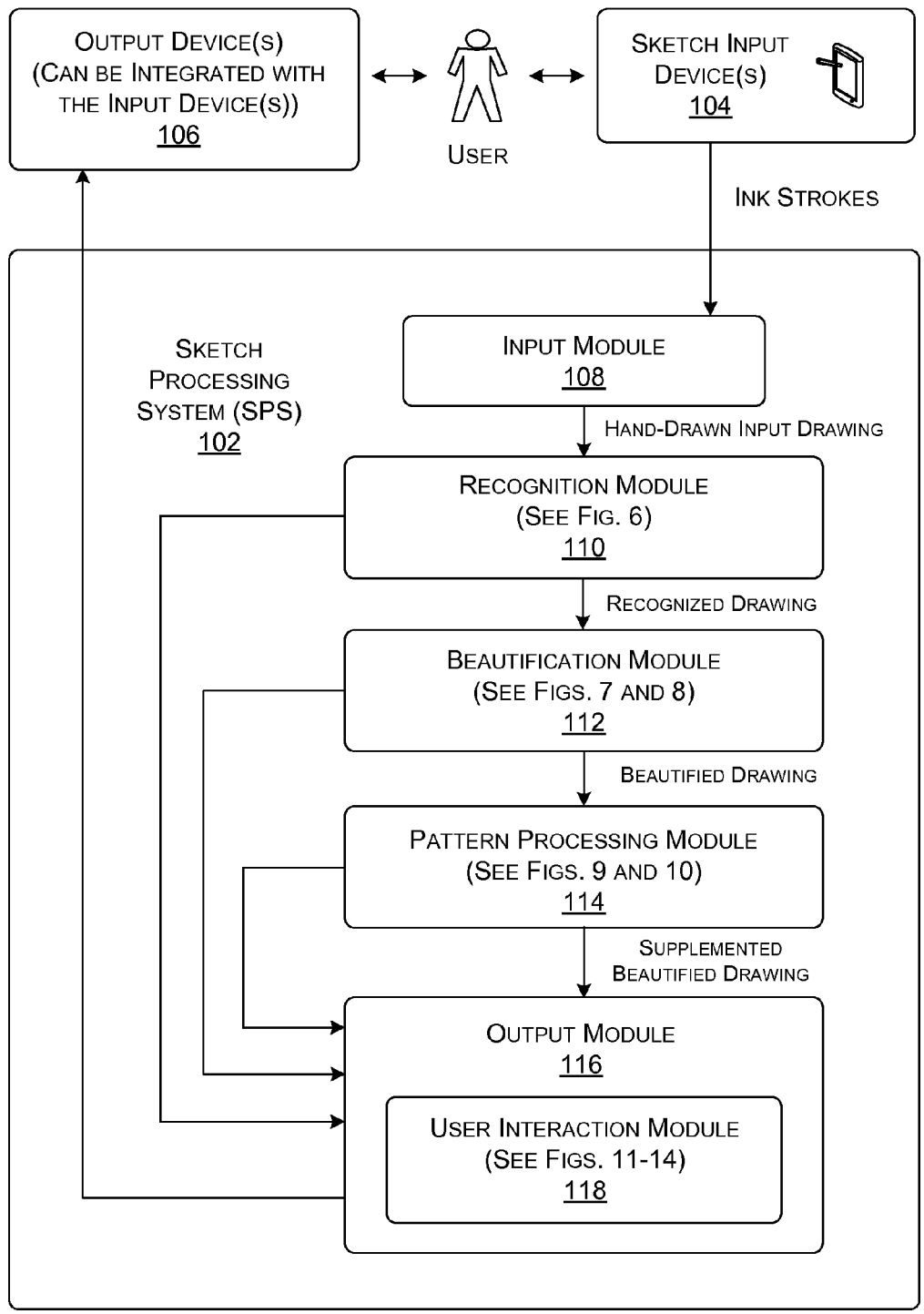
FIG. 1 shows an illustrative environment in which a sketch processing system (SPS) transforms an original hand-drawn drawing into a refined output drawing

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Sketch Processing System A.1. Overview FIG. 1 shows an illustrative environment 100 in which a sketch processing system (SPS) 102 transforms an original hand-drawn drawing into a refined output drawing. The environment 100 can correspond to any context in which a user wishes to produce a drawing having precise geometric shapes and precise spatial relationships among the geometrical shapes. Without limitation, for example, a user can use the SPS 102 in an engineering or scientific environment, a business-related environment, an academic environment, and so on. In still other cases, a user can use the SPS 102 to produce drawings for strictly aesthetic/artistic reasons, and/or as an amusement.

The environment 100 can include (or can be conceptualized as including) a number of components that perform different functions. These elements will be described below in a generally top-down manner. Later section will provide further details regarding the components in FIG. 1.

First, the environment 100 includes at least one sketch input device 104 for inputting an original drawing. In one implementation, the sketch input device 104 can include any mechanism having a touch-sensitive surface on which the user may draw. For example, the sketch input device 104 can correspond to a graphics tablet. More specifically, in some cases, the touch-sensitive surface of the sketch input device 104 may be co-extensive with a display surface of an output device 106. This enables the output device 106 to produce a visible rendering of the user's sketch as the user draws the sketch on the sketch input device 104. In another case, the touch-sensitive surface of the sketch input device 104 can correspond to a surface that is separate from the output device 106. In any case, the user can produce the original drawing by manipulating a passive and/or active implement of any type (e.g., a stylus, pen, etc.), and/or with a finger, etc.

In yet another case, the sketch input device 104 may represent a scanning mechanism which scans in a hard-copy version of an original drawing created by the user or any other user or any other entity. In yet another case, the sketch input device 104 can represent an interface which receives a previously generated original drawing, obtained from any remote source (e.g., a network-accessible repository of such drawings). Still other implementations of the sketch input device 104 are possible.

Now referring to the SPS 102 itself, this functionality can include an input module 108 for receiving the original drawing supplied by the sketch input device 104. The SPS 102 then proceeds to operate on the original drawing in three main phases. In a first phase, a recognition module 110 recognizes geometric primitives that may be used to construct higher-order shapes in the original drawing. In the concrete examples featured herein, the geometric primitives correspond to straight lines and circles. However, in other cases, the recognition module 110 can detect other types of geometric primitives, such as ellipses, arcs, etc. (instead of, or in addition to, the recognition of straight lines and circles).

The recognition module 110 also detects geometric constraints associated with the components that it has detected. Some of these constraints correspond to characteristics of individual components. Other constraints correspond to geometric relationships between pairs of components (or, more generally, among different groups of components).

As a result of its processing, the recognition module 110 produces a recognized drawing. That drawing is associated with a set of recognized components and a second of recognized constraints. Section A.2 provides additional details regarding one manner of operation of the recognition module 110.

A beautification module 112 receives the recognized drawing as input, along with its associated set of recognized components and constraints. The beautification module 112 then refines the recognized drawing to produce a beautified drawing. In one implementation, this refinement entails redrawing the recognized lines and circles as perfectly straight lines and perfectly round circles, respectively. Further, the refinement involves redrawing the components in a manner that conforms to the recognized geometrical relationships among the components (e.g., by drawing two sketched lines that have been inferred as being parallel as two perfectly parallel lines). Generally, the beautification module 112 produces an output that is referred to herein as a beautified drawing. Section A.3 provides additional details regarding one manner of operation of the beautification module 112.

A pattern processing module 114 receives the beautified drawing as input. The pattern processing module 114 then attempts to find a predominant pattern in the beautified drawing. In one case, the pattern processing module 114 can perform this task by identifying transformations between different objects which appear in the beautified drawing. This yields a set of transformations that is generally referred to as transformation information herein. The pattern processing module 114 can then use a voting technique to identify one or more transformations that appear to be most prevalent within the transformation information. Such one or more transformations describe the predominant recurring pattern in the beautified drawing. The pattern processing module 114 can then use this pattern as a template to add at least one additional component to the beautified component. Section A.4 provides additional details regarding one manner of operation of the pattern processing module 114.

An output module 116 can present an output drawing that reflects the output of any stage of the above-described processing. The output module 116 can also include a user interaction module 118. The user interaction module 118 provides various tools that allow a user to modify the drawing at various stages of processing. For example, the user interaction module 118 can display the constraints that have been detected following the operation of the recognition module 110. The user interaction module 118 can then invite the user to modify or remove any of the constraints that have been detected, and/or to add new constraints. Section A.5 provides further details regarding one manner of operation of the user interaction module 118.

The output device 106 can correspond to an electronic display device of any type. Alternatively, or in addition, the output device 106 can correspond to any of: a printer; an interface which transmits an output drawing to a destination site; an interface which stores the output drawing, and so on.

In one implementation, the recognition module 110, beautification module 112, and pattern processing module 114 can be used together in the manner summarized above. Each of the recognition module 110, beautification module 112, and pattern processing module 114 can also be separately used in other contexts, with or without the inclusion of the other two modules. To cite one example, the pattern processing module 114 can be used to detect recurring patterns in objects which appear in any graph or drawing, where those objects may or may not have been produced by the recognition module 110 and the beautification module 112.

Figure 2:
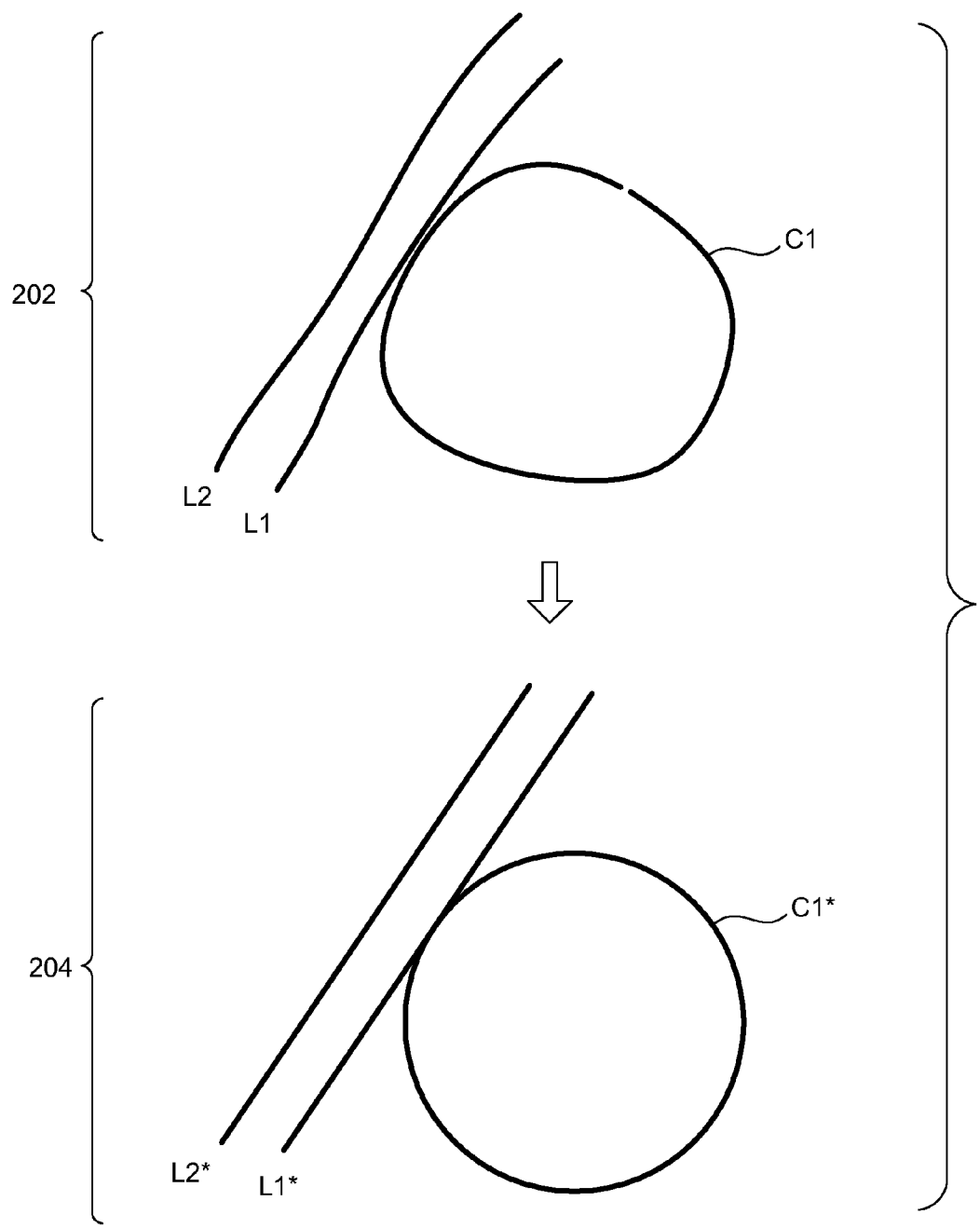
FIGS. 2-4 show three respective examples of the operation of the SPS of FIG. 1.

Advancing to FIG. 2, this figure shows one example of the operation of the SPS 102 of FIG. 1. In phase 202, the user has just completed sketching an original drawing using the sketch input device 104. In this particular scenario, the user intended to draw a first straight line L1 which is tangent to a circle C1. The user also intended to draw a second straight line L2 that is parallel to the first straight line L1. But since the user is sketching this drawing by hand, the geometric components and relationships are only roughly and imprecisely drawn.

After making the original drawing, the user may instruct the SPS 102 to commence its recognition processing. Alternatively, the user may produce the drawing in piecemeal fashion by toggling between the drawing phase and the recognition/beautification phases. That is, the user can instruct the SPS 102 to recognize and beautify the original drawing after creating only part of a complete drawing. The user may then add one or more new components to the beautified partial drawing that has been produced.

In phase 204, the recognition module 110 and the beautification module 112 have processed the original drawing, producing the beautified drawing shown at the bottom of FIG. 2. The beautified drawing indicates that the recognition module 110 has correctly interpreted the intent of the user to draw line L1 tangent to the circle C1, and line L2 parallel to line L1. The beautification module 112 has then correctly applied the recognized components and constraints to create a "clean" version of the original drawing, e.g., including perfectly straight lines L1 and L2, and a perfectly round circle C1. Moreover, the beautification module 112 has correctly drawn the two lines (L1 and L2) so that they are perfectly parallel, and the line L1 so that it is perfectly tangent to the circle C1.

Figure 3:
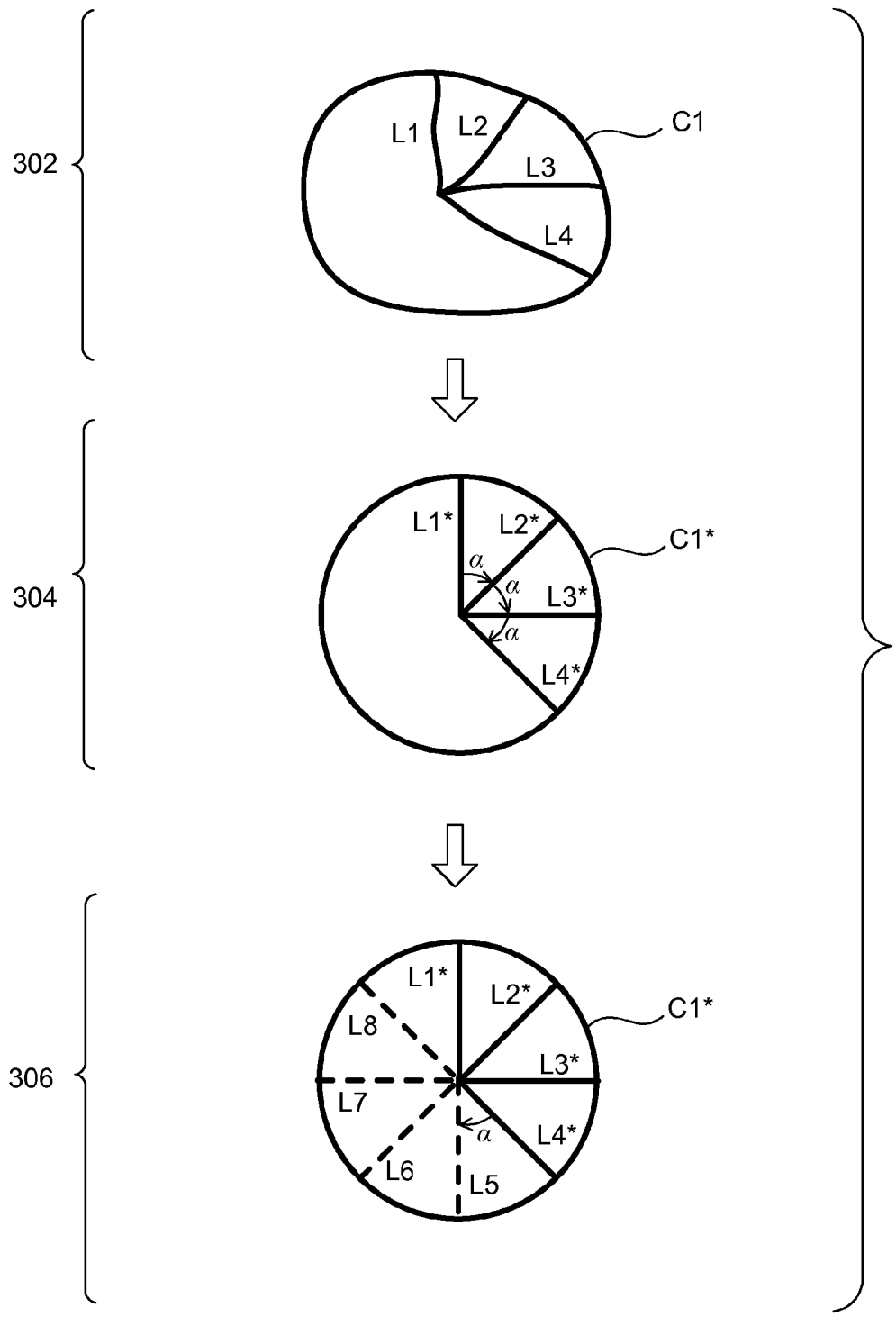

FIG. 3 shows a second example of the operation of the SPS 102. In phase 302, the user has completed the original drawing. In this example, the user intended to draw a circle C1 having four evenly-spaced spokes (L1, L2, L3, L4). But because the user is drawing by hand, this intent has only been roughly approximated in the original drawing. In phase 304, the recognition module 110 and the beautification module 112 have correctly produced a formalized version of a circle with even-spaced four spokes. That is, each spoke is separated from its neighboring spoke by the precise angle α (except for the angle between lines L1 and L4).

In phase 306, the pattern processing module 114 has discovered that the four spoke lines establish a consistent pattern in the beautified drawing. That is, the pattern is exhibited by the fact that line L2 is displaced from line L1 by the angle α, line L3 is displaced from line L2 by the same angle α, and line L4 is displaced from line L3 by the same angle α. The pattern processing module 114 then applies the pattern by drawing new lines L5, L6, L7, and L8, each displaced from its predecessor line by the angle α, thereby completing the partial structured-drawing of the second phase 304. (Note that the SPS 102 does not add components to the beatified drawing of FIG. 2 because this drawing does not include a recurring pattern.)

Figure 4:
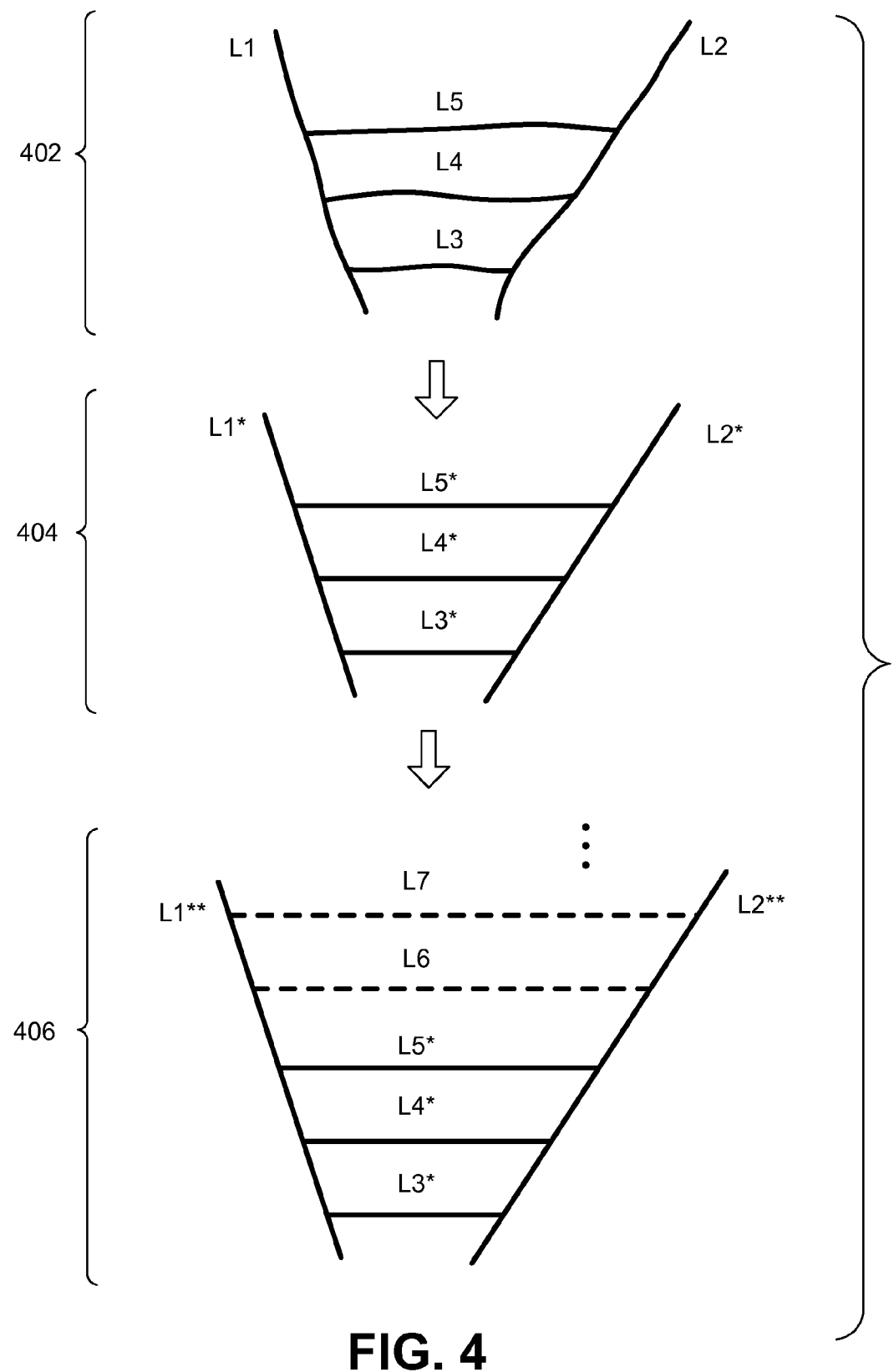

FIG. 4 shows a third example of the operation of the SPS 102. In phase 402, the user has finished sketching an original drawing that resembles a ladder with rungs of increasing widths, where the rungs are equally spaced in the vertical dimension of the drawing. Again, however, the user has conveyed his or her intent in only a rough manner. In phase 404, the recognition module 110 and the beautification module 112 have correctly produced a ladder having straight line segments that "cleanly" resembles the original drawing.

In phase 406, the pattern processing module 114 has discovered the prevalent pattern exhibited by the ladder shown in phase 404. More specifically, in this case, the pattern processing module 114 has identified two different prevalent transformations in the beautified drawing. The first transformation corresponds to the offset of each rung's left endpoint with respect to its predecessor rung's left endpoint along the line L1. The second transformation corresponds to the offset of each rung's right endpoint with respect to its predecessor rung's right endpoint along the line L2. These two transformations form a higher-order pattern insofar as the first and second transformations are exhibited in two sides of the same rungs. The pattern processing module 114 has then applied the detected higher-order pattern to produce additional rungs, e.g., rungs L6 and L7, etc. Section A.4 will clarify one manner by which the pattern processing module 114 can achieve the result illustrated in FIG. 4.

Figure 5:
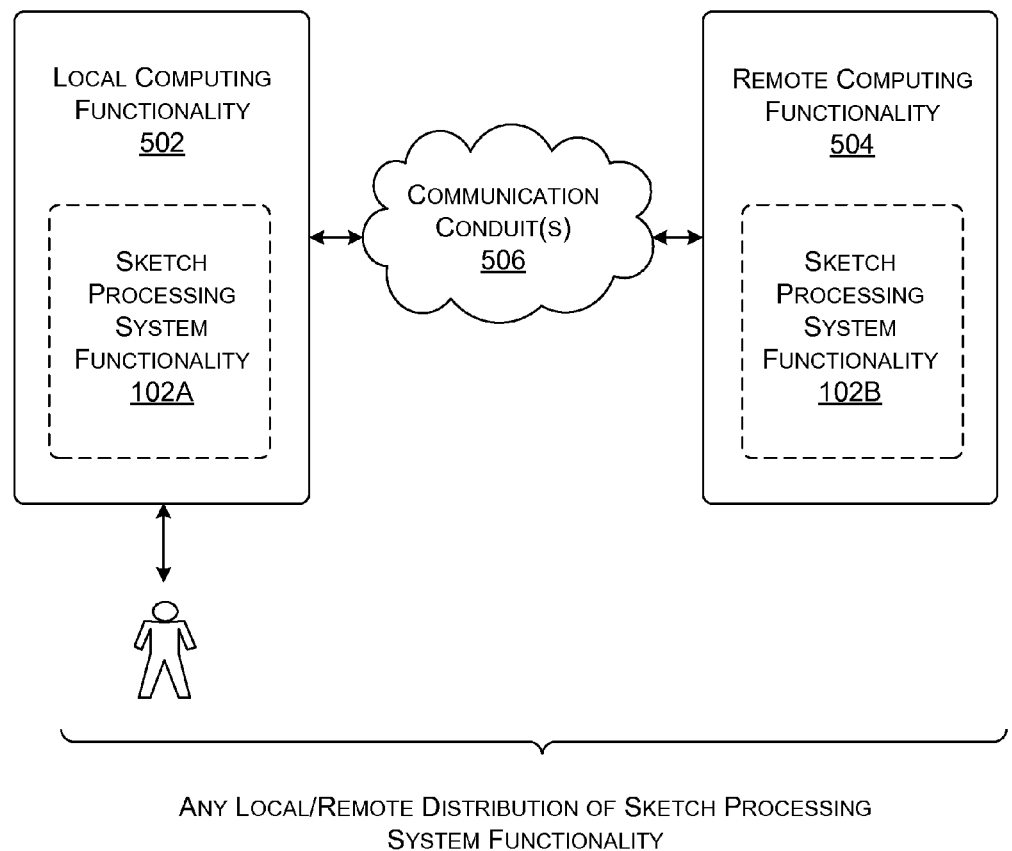
FIG. 5 shows one implementation of the SPS of FIG. 1.

FIG. 5 shows various implementations of the SPS 102 introduced in FIG. 1. In a first implementation, local computing functionality 502 implements all aspects of the SPS 102. In a second implementation, remote computing functionality 504 implements all aspect of the SPS 102. The user may gain access to the remote processing functionality 504 via the local processing functionality 502, via a communication conduit 506. In a third implementation, the local computing functionality 502 implements some aspects of the SPS 102 (as indicated by sketch processing system functionality 102A provided by the local processing functionality 502), while the remote computing functionality 504 implements other aspects of the SPS 102 (as indicated by sketch processing system functionality 102B provided by the remote processing functionality 504).

In any implementation, the local computing functionality 502 can correspond to any user device, such as, but not limited to, a personal computer, a computer work station, a tablet computing device, a laptop computing device, a netbook computing device, a game console device, a set-top box device, a smartphone device, a personal digital assistant device, a portable game device, an electronic book reader device, and so on.

The remote computing functionality 504 can correspond to one or more sever computers and associated data stores, routing functionality, etc. The equipment associated with the remote computing functionality 504 can be provided at a single site or can be distributed over plural sites.

The communication conduit 506 can correspond to any local area network, wide area network, or combination thereof. The communication conduit 506 can include any combination of wireless links and hardwired links, and can be governed by any protocol or combination of protocols.

A.2. Recognition Module

Figure 6:
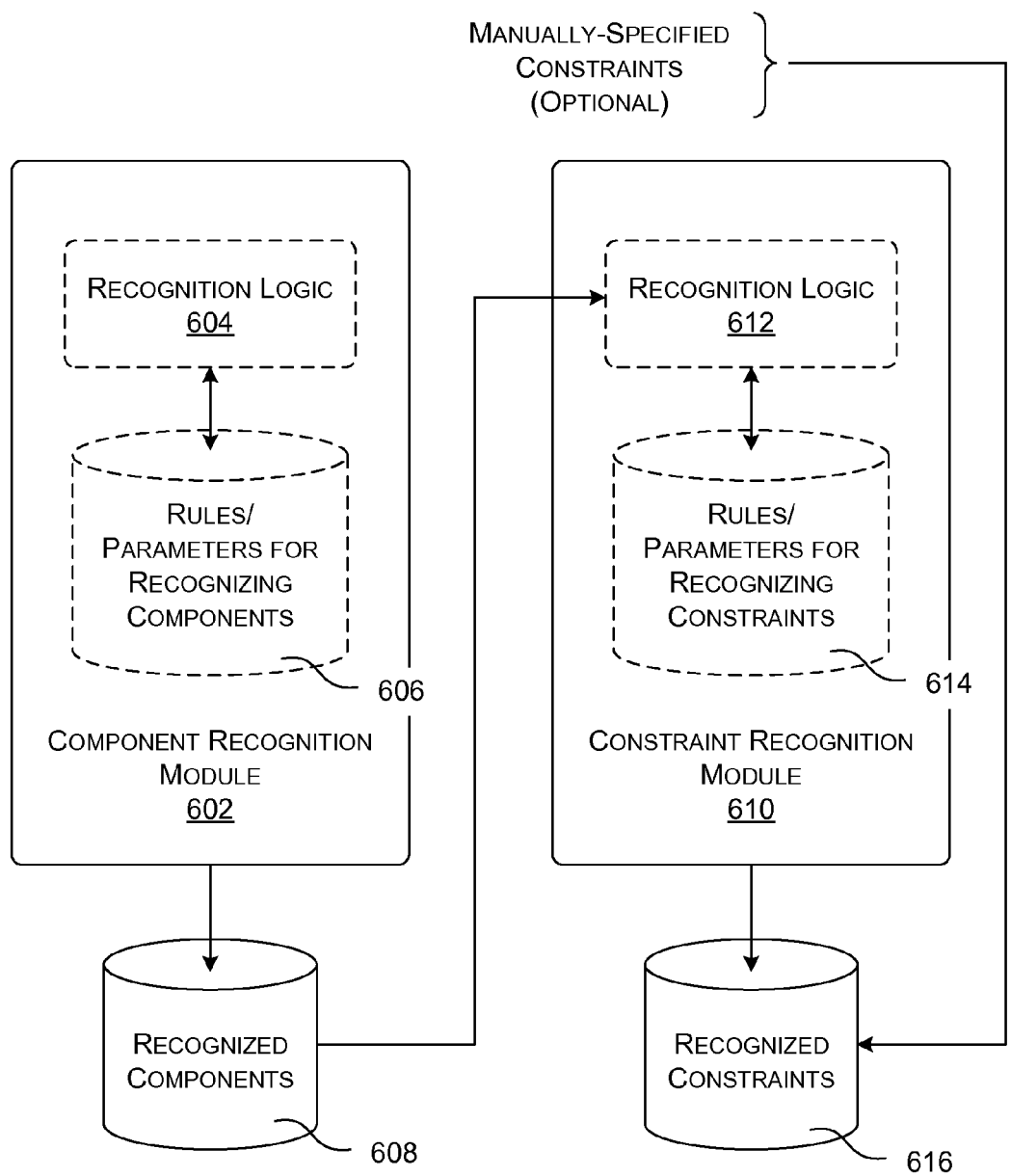
FIG. 6 shows one implementation of a recognition module that can be used in the SPS of FIG. 1.

FIG. 6 shows one implementation of the recognition module 110. The recognition module 110 includes a component recognition module 602 that performs the task of recognizing primitive components in the original drawing, such as straight lines and circles. More specifically, the component recognition module 602 includes recognition logic 604 for recognizing components, as governed by rules provided in a data store 606. The component recognition module 602 stores information regarding components that it has detected in a data store 608. For brevity, this disclosure states that the data store 608 stores the components (as opposed to information regarding the components).

The component recognition module 602 can use any approach to recognize primitive components. For example, the component recognition module 602 can identify cusps in ink strokes drawn by a user. A cusp corresponds to a region of high curvature in a digital ink stroke, e.g., corresponding to an endpoint, a corner, etc. The component recognition module 602 can then examine each ink stroke that includes two cusps to determine what kind of component it corresponds to. If an ink stroke includes more than two cusps, the component recognition module 602 can break it up into segments containing two cusps each and then analyze each such segment.

For example, the component recognition module 602 can determine whether an ink stroke corresponds to a circle by determining whether it satisfies the following representative characteristics: (a) the cusps of the ink stroke (corresponding to its endpoints) are within a prescribed close distance to each other; and (b) the path of the ink stroke has approximately uniform curvature about a centroid. The component recognition module 602 can determine whether the ink stroke has uniform curvature by measuring the standard deviation of its radius, and then comparing that standard deviation with a threshold. If an ink stroke has been classified as a circle, the component recognition module 602 can identify the center of the circle as the centroid of the ink stroke. Further, the component recognition module 602 can identify the diameter of the circle as an average of the width and height of a bounding box which encloses the ink stroke.

The component recognition module 602 can determine whether an ink stroke corresponds to a straight line by determining a linearity measure for the ink stroke, as in:

$$\text{Linearity} = \left\| 1.0 - \frac{\sum_{i=1}^{n-1} \|p_i, p_{i+1}\|}{\|p_1, p_n\|} \right\|.$$

In this expression, $p_i$ corresponds to any point along the ink stroke, where $p_1$ is the first point and $p_n$ is the last point. In one implementation, the component recognition module 602 can interpret an ink stroke as straight if Linearity <0.1. The component recognition module 602 can use any environment-specific rules to formally represent a detected straight line segment. For example, the component recognition module 602 can identify the slope of a line segment as the slope of the line which connects its endpoints, or the average slope of sub-segments which compose the line segment, and so on.

In addition to classifying each component (e.g., as either a line or a circle), the component recognition module 602 can store information regarding the relative order in which the component was created in the course of creating the original drawing. The component recognition module 602 can also store information regarding a canonical order in which the component appears in the original drawing. One such canonical ordering O arranges components from left to right followed by top to bottom, such that a component closest to the upper left-hand corner of the original drawing corresponds to the first entry in the ordering O and the component closest to the lower right-hand corner of the drawing corresponds to the last entry in the ordering O. This ordering O helps ensure that a deterministic view of each diagram emerges, independent of the order in which its components were drawn.

The component recognition module 602 can also store a probability score for each component that describes a level of certainty at which it has estimated the class of the component. The component recognition module 602 can form this score by determining how closely the characteristics of an ink stroke match the predetermined canonical characteristics of a line or circle.

The rules stored in the data store 606 may govern the behavior of the component recognition module 602. For example, the rules may govern: (a) the type of components that the component recognition module 602 attempts to find in the original drawing; (b) the techniques that the component recognition module 602 uses to find the components; and (c) the parameters (e.g., thresholds) that the techniques use in detecting the components, etc. These rules are both extensible and customizable. They are extensible in the sense that any user (e.g., an end user, a developer, etc.) can add new rules and remove existing rules. They are customizable insofar any user can modify the parameter values and/or other adjustable features of the rules to address any environment-specific objectives.

The recognition module 110 also includes a constraint recognition module 610 that performs the task of recognizing geometric constraints associated with the components that have been detected by the component recognition module 602. More specifically, the constraint recognition module 610 includes recognition logic 612 for recognizing constraints, as governed by rules provided in a data store 614. The constraint recognition module 610 stores information regarding constraints that it has detected in a data store 616. For brevity, this disclosure states that the data store 616 stores the constraints (as opposed to information regarding the constraints). The constraint recognition module 610 can also store probability scores which reflect the level of confidence at which it has detected each constraint.

More specifically, in one approach, the data store 606 can identify a list of known constraints that may be present in the original drawing. Some of these constraints pertain to characteristics of an individual component. Other constraints pertain to geometric relationships between two or more components.

Without limitation, in one implementation, the following constraints may pertain to any line segment in the original drawing: (a) the line segment is a vertical line segment; (b) the line segment is a horizontal line segment; (c) the line segment is collinear with another line segment; (d) the line segment is parallel to another line segment; (e) the line segment is perpendicular to another line segment; (f) the line segment is a member of a group of line segments that are equidistant to each other; (g) the line segment touches another line segment; (h) the line segment intersects with another line segment; (i) the line segment has the same length as another line segment; (j) the line segment has an endpoint that is at the same horizontal level as another line segment; (k) the line segment has an endpoint that is at the same vertical level as another line segment, and so on.

The following constraints may pertain to any circle in the original drawing: (a) the circle shares the same radius as another circle; (b) the circle is concentric with respect to another circle; (c) the circle touches another circle at its circumference; (d) the circle intersects with another circle; (e) the circle has a circumference that passes through the center of another circle, and so on.

The following constraints may pertain to any line in relation to a circle in the original drawing: (a) the line segment is tangent to the circle; (b) the line segment intersects the circle; (c) the line segment passes through the center of the circle; (d) the line segment touches the circumference of the circle with an endpoint; (e) the line segment touches the center of the circle with an endpoint, and so on.

In general, some of the above-described relational constraints are set forth with respect to two components. But, more generally, a constraint can be defined with respect to any number of components.

The constraint recognition module 610 also identifies the rules that the constraint recognition module 610 can use to determine whether each constraint is present in the original drawing. For example, consider the following representative rules.

Parallel Line Rule.

The constraint recognition module 610 can determine whether an angle between two lines is below a prescribed threshold. If so, the constraint recognition module 610 can conclude that the lines are parallel.

Same Length Rule.

The constraint recognition module 610 can determine whether the length of a first line segment is within a prescribed tolerance of the length of another line segment. If so, the constraint recognition module 610 can conclude that these lines are the same length.

Same Radii Circle Rule.

The constraint recognition module 610 can determine whether the radius of a first circle is within a prescribed tolerance of the radius of another circle. If so, the constraint recognition module 610 can conclude that these circles have the same radii.

Tangent Line Rule.

The constraint recognition module 610 can investigate the relationship between a line L and a circle C by drawing a test line from the center of the circle C to the line L, forming a perpendicular with that line L. The constraint recognition module 610 then determines the distance between the point at which the test line intersects the circumference of the circle C and the line L. If this distance is below a prescribed threshold distance, then the constraint recognition module 610 concludes that the line L is tangent to the circle C.

The set of rules provided in the data store 614 is both extensible and customizable. The rules are extensible in the sense that any user can add new rules and/or remove existing rules. By doing so, the user can also instruct the constraint recognition module 610 to detect new types of constraints, and/or to detect existing types of constraints in a new manner. The rules are customizable insofar as the user can modify the parameter values and/or other adjustable features of the rules to address any environment-specific objectives.

Finally, FIG. 6 indicates that a user can add explicit constraints to the data store 616 to supplement the implicit constraints recognized by the constraint recognition module 610. The user can perform this task in at least two ways. In a first approach, the user can add a marking to the original drawing which conveys an explicit constraint. In a second approach, the user can specify an explicit constraint via a separate interface, e.g., in textual form or in some other form. Section A.5 will provide additional details regarding illustrative ways that a user can convey explicit constraints.

A.3. Beautification Module

Figure 7:
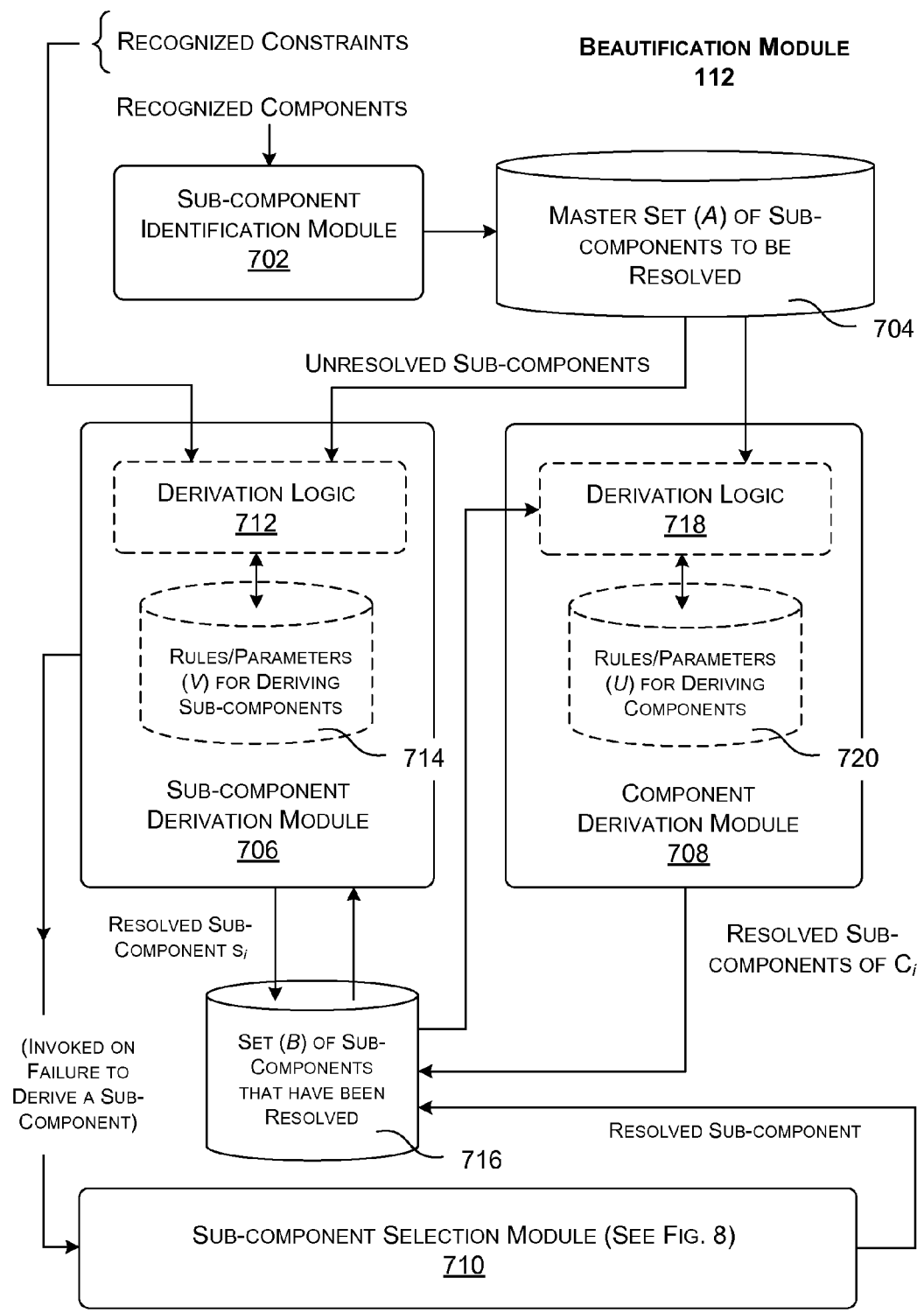
FIG. 7 shows one implementation of a beautification module that can be used in the SPS of FIG. 1.

FIG. 7 shows one implementation of the beautification module 112. To review, the beautification module 112 converts the recognized drawing into a beautified drawing. In doing so, the beautification module 112 redraws the original drawing so that it "cleanly" conforms to the constraints that have been recognized by the recognition module 110.

To begin with, the beautification module 112 includes a sub-component identification module 702 that enumerates the sub-components within each component that has been recognized by the recognition module 110. A sub-component refers to a descriptive part of a component. For example, a straight line segment is made up of the following sub-components: (a) a slope of the line segment; (b) an intercept of the line segment (that is, a y-intercept of the line segment if the line segment is not vertical; otherwise an x-intercept); (c) the individual x and y coordinates of the line segment's two endpoints; and (d) a length of the line segment. A circle is made up of the following sub-components: (a) the individual x and y coordinates of its center; and (b) its radius. As stated above, other implementations can recognize other primitive components, such as arcs, and ellipses. These components will have their own respective sub-components. For example, the sub-components of an ellipse will also include information regarding its major and minor axes.

The sub-component identification module 702 stores information regarding the identified sub-components in a data store 704. At this point, the beautification module 112 may simply store all (or most) of these sub-components as variables without determinative values. For example, the sub-component identification module 702 will record that a particular line L includes two endpoints, but, at this initial stage, the beautification module 112 may not know the x-y coordinates of those endpoints (corresponding to the placement of the line L in the beautified drawing). In the terminology used herein, these sub-components are said to be "unresolved." Once the values of the sub-components are known, these sub-components become resolved. Hence, at the outset, the data store 704 provides a master set (labeled as set A) of the unresolved sub-components.

The beautification module 112 next goes to work by iteratively discovering the values of the unresolved sub-components in the set A. Once any subset of the sub-components of a component that uniquely determine that component are all resolved, the component itself is said to be resolved. Before that time, the component is said to be unresolved. To perform this iterative operation, the beautification module 112 relies on three main components: a sub-component derivation module 706; a component derivation module 708; and a sub-component selection module 710. As a point of clarification, note that while a component may be "unresolved" in the context of its eventual placement in the beautified drawing, that component has a known placement in the original drawing (as detected by the recognition module 110). As will be clarified in the ensuring description, the beautification module 112 can leverage this "raw" placement information in various circumstances in the production of the beautified drawing.

Consider first the operation of the sub-component derivation module 706. This module includes derivation logic 712 which works in conjunction with an extensible and customizable set of rules stored in a data store 714. In operation, the sub-component derivation logic 712 first selects a sub-component $s_i$ within the master set (A) of sub-components (stored in data store 704) which has yet to be resolved (e.g., meaning that its value(s) are unknown). The sub-component derivation module 706 will then determine whether this sub-component can be derived based on: (a) information associated with components that are already known (resolved), as stored in another set (B) provided in a data store 716; (b) the recognized constraints determined by the recognition module 110 which affect this sub-component $s_i$; and (c) the derivation rules provided in the data store 714. If the sub-component $s_i$ can be derived, the sub-component derivation module 706 will add a resolved counterpart of the sub-component $s_i$ to the set B in the data store 716.

More specifically, each derivation rule provided in the data store 714 specifies how to determine the value of some sub-component from values of some other sub-component(s) under some appropriate constraint(s). For example, suppose that it has been determined that a line L is tangent to a circle C. A first rule can leverage this constraint by stating that the radius of the circle can be computed based on the center of the circle C, the slope of the line L, and the intercept of the line L. In particular, the radius can be computed as the perpendicular distance between the center of the circle and the line L (where the path of line L is determined by its slope and its intercept). Another rule that is applicable to this constraint states that the intercept of the line L can be computed from the slope of the line L, the center of the circle C, and the radius of the circle C.

Now advancing to the sub-component selection module 710, this module is invoked whenever the sub-component derivation module 706 determines that it is unable to find any sub-components that can be resolved in the above-described manner, e.g., based on the previously resolved sub-components in the set B, the applicable constraints, and the rules in the data store 714. This may happen at any point in the processing of the recognized drawing. For example, at the beginning of its analysis, the beautification module 112 may not have enough concrete information to determine the values of any sub-component. This may also happen at any point in the processing of a drawing that includes separate parts that are isolated from each other. In any event, the sub-component selection module 710 breaks such an impasse by finding an unresolved sub-component that is deemed most worthy to resolve. The sub-component selection module 710 then determines the value of this selected sub-component based on drawing information extracted directly from the original drawing.

Figure 8:
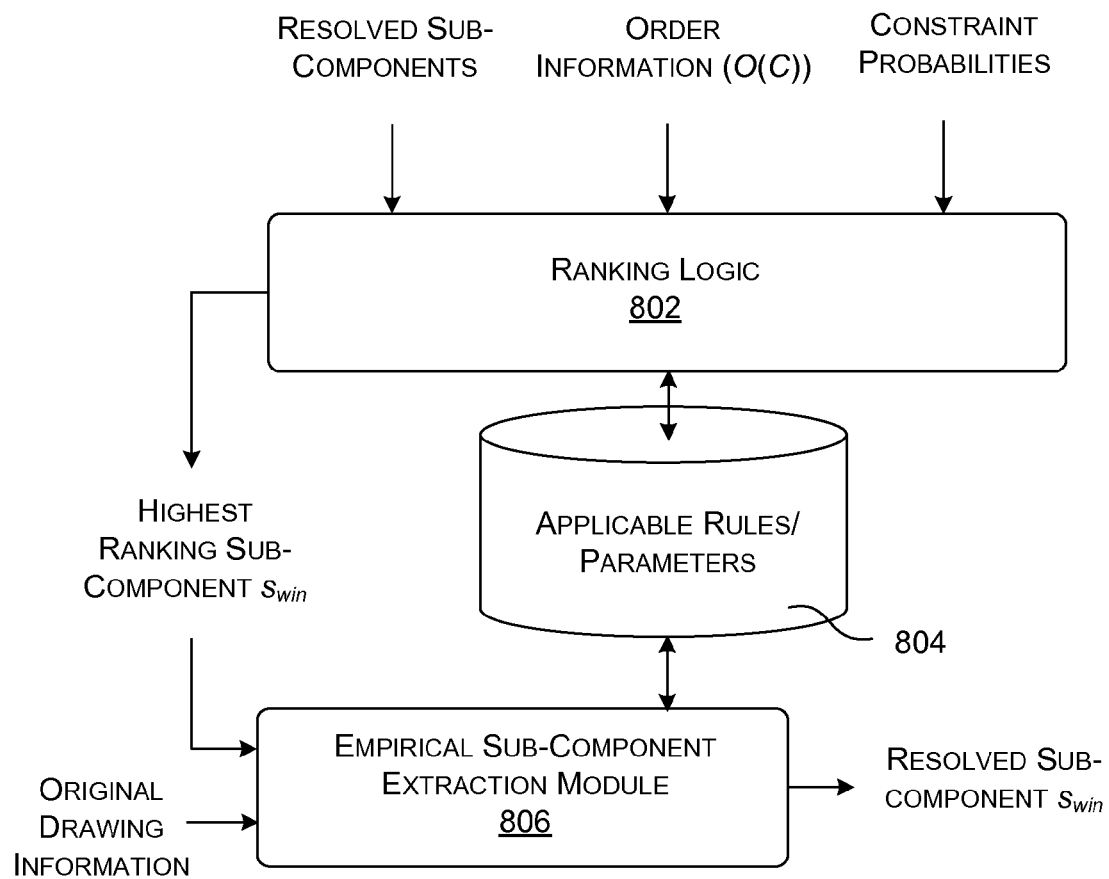
FIG. 8 shows one implementation of a component selection module that can be used in the beautification module of FIG. 7.

FIG. 8 elaborates on one illustrative composition of the sub-component selection module 710. This module 710 includes ranking logic 802 for examining all sub-components that have yet to be fully resolved. The ranking logic 802 then selects the sub-component that is considered the most appropriate to resolve.

In one example, the ranking logic 802 can rank the sub-components by performing lexicographic ordering using the following formula:

$$\text{Rank}(s) = \left( \text{Max}_S \left\{ \frac{\sum_{s' \in S \cap B} W(s')}{\sum_{s' \in S} W(s')} \right\}, O(C), \frac{1}{W(s)} \right).$$

From a high-level perspective, this formula assigns a rank to each unresolved sub-component s under consideration. The sub-component s belongs to a particular parent component C. The formula has three parts. The first part assigns a score to the component C based on its assessed suitability for resolution. The second part (O(C)) assigns a score to the component C based on the order in which the component C appears in the original drawing, e.g., by making reference to the canonical ordering. The third part assigns a score to the particular sub-component s under consideration.

In operation, the beautification module 112 uses the first part of the ranking formula to find the component $C_{win}$ that is deemed most appropriate to resolve. If two or more components have the same score, the beautification module 112 can use the second part of the formula to select a single component $C_{win}$ from among this set of same-score components. For example, the beautification module 112 can pick the component that has the lowest order in the canonical ordering (O(C)) of components. Having selected the top-ranking component $C_{win}$, the beautification module 112 can then use the third part of the ranking formula to select the unresolved sub-component $s_{win}$ of the component $C_{win}$ that is considered most appropriate to be resolved (if, in fact, there are more than one unresolved sub-component in $C_{win}$). As will be described below in greater detail, the beautification module 112 will then extract the value of $s_{win}$ from its "raw" value in the original drawing, and store this value in the set B of known sub-components in the data store 716.

Consider the first part of the ranking formula in greater detail. In this expression, each S refers to a minimal set of sub-components of the component C (where, as said, C is the "parent" of the component s) that uniquely determine the component C. That is, there can be multiple different combinations of sub-components which uniquely determine the same component C; therefore, there can be multiple sets S. Each member of a set S is denoted as s'. The numerator of the expression identifies a sum that is formed based on the known sub-components of a particular set S. In one implementation, the elements of that sum are provided by applying some weighting function W (s'). The denominator of the expression identifies a sum that is formed based on all of the sub-components in the particular set S, regardless of whether they are known or unknown. Again, the elements of that sum are provided by applying the weighting function W(s'). The expression as a whole finds a maximum value by considering different sets (S) that can be used to uniquely determine C.

In one implementation, the weighting function W(s') maps each sub-component to some score between 0 and 1. Hence, this weighting function can be used to assert the relative importance of knowing some sub-component over another sub-component. More specifically, recall that the overall purpose of the ranking formula is to identify the winning sub-component $s_{win}$ (which belongs to the winning component $C_{win}$) that is considered the most appropriate sub-component to resolve by using a "raw" value extracted from the original drawing. Some sub-components are more effective to resolve in this empirical manner than others for various reasons. For example, an inconsistency in the slope of a line may be more visually discernible than the length of the line; this makes the length of the line more preferable to resolve based on empirical evidence compared to the slope. In addition, or alternatively, errors in the placement of some sub-components may be easier to later resolve compared to errors in other sub-components. The weighting function assigns weights to sub-components that reflect these types of considerations. For example, for a line, in one merely illustrative case, the weighting function can assign the scores of: 0.5 to each endpoint; 0.5 to the length; 0.75 to the intercept; and 1.0 to the slope. For a circle, the weighting function can assign the scores of: 0.5 to each endpoint; and 1.0 to the radius.

In the context of the first part of the ranking formula, the weighting function acts to bolster the score of components which have strongly-weighted sub-components that are already known. In the context of the third part of the ranking formula, the weighting function disfavors strongly-weighted unknown sub-components. For example, consider a component in which the slope is known. The first part of the ranking formula can identify this component as a good candidate to resolve because a strongly-weighted sub-component (i.e., slope) is already known. The beautification module 112 can then leverage the third part of the ranking formula to identify the unknown sub-component $s_{win}$ of this component that is least problematic to resolve based on empirical evidence.

The weighting function can also be enriched by taking into consideration a level of confidence at which a sub-component is considered to be known. For example, the beautification module 112 may have obtained the value of a sub-component, in part, by applying a relationship defined by a particular constraint. Further, the recognition module 110 may have detected that constraint with a certain confidence, as expressed by a probability score. The weighting function can take the probability score into account when weighting that particular sub-component. In addition, or alternatively, the weighting function can take into account the confidence at which the recognition module 110 has recognized the particular component.

In yet another variation, the weighting function assigns all sub-components a weight of 1.0. This effectively removes any role the weighting function may have in selectively promoting some sub-components over other sub-components. That is, with this weighting option, the summation in the numerator sums up the number of known sub-components in S, while the summation in the denominator sums up an entire number of sub-components in S, without respect to whether they are known or unknown.

The above manner operation is set forth by way of example, not limitation. More generally, the operation of the ranking logic 802 can be determined by extensible and customizable rules provided in a data store 804. The rules can specify the factors that are taken into account when ranking sub-components, the equation (s) to be used to rank the sub-components, the values of parameters to be used in the equation (s), and so on.

Having selecting a sub-component $s_{win}$ that is deemed most appropriate, a sub-component extraction module 806 determines the value of this sub-component from information extracted from the original drawing. For example, suppose that the winning sub-component $s_{win}$ corresponds to the x coordinate of an end-point of a line segment. The sub-component extraction module 806 will consult the original drawing to determine the x coordinate of this endpoint of the line segment.

In the above explanation, the beautification module 112 invokes the sub-component selection module 710 whenever it reaches an impasse in deriving sub-components based on the set B of known sub-components. But in another implementation, the beautification module 112 can using a ranking operation each time that it attempts to resolve an unknown sub-component, regardless of whether an impasse has been reached. That is, the beautification module 112 can identify a sub-component that is deemed most worthy of resolution, and then attempt to resolve it.

Returning to FIG. 7, having successfully determined a sub-component (either by inference or by reading it from the drawing), the beautification module 112 next invokes the component derivation module 708. The component derivation module 708 includes derivation logic 718 which works in conjunction with an extensible and customizable set of rules stored in a data store 720. In operation, the component derivation module 708 determines whether it can now fully resolve the parent component C to which the sub-component s that has just been determined belongs. For example, suppose that the sub-component derivation module 706 has determined the x coordinate of one end-point associated in a line L. The component derivation module 708 asks whether it can now fully determine this line. The component derivation module 708 can make this determination based on: (a) information associated with sub-components that are already known (resolved), as stored in the set (B) provided in the data store 716; and (b) the derivation rules provided in the data store 720. If the component C can be fully resolved, the component derivation module 708 will resolve it and all of its sub-components and store them in the data store 716.

Consider the following representative rules that may be stored in the data store 720. A first rule states that a line is uniquely determined from the x-y coordinates of the two endpoints, or even from its slope, intercept, and y coordinates of its two endpoints (if the slope is not vertical). Another rule states that a circle is uniquely determined if all of its sub-components are known.

As a closing general observation, note that there may be multiple ways that the beautification module 112 can successfully derive a particular sub-component or a particular component. This characteristic is advantageous because it allows the beautification module 112 to robustly resolve sub-components within the drawing, even though certain constraints were not correctly recognized by the recognition module 110.

To illustrate the above point, consider the example in which the user sketches a square having a left line segment and a right line segment that are each roughly vertical, and a top line segment and a bottom line segment that are roughly horizontal. The SPS 102 will ideally infer the following constraints between the four recognized line segments: (1) Two line segments are horizontal and two are vertical; (2) The horizontal line segments are parallel, and are both perpendicular to the vertical line segments; (3) The vertical line segments are parallel, and are both perpendicular to the horizontal line segments; (4) All the line segments in the sketch form a connected path, and are all equal in length; (5) The perpendicular distance between horizontal line segments is the same as that between vertical line segments.

Beautification may proceed as follows. After computing the slope of all the line segments, the algorithm reads off the x-y coordinates of the top-left corner and the y-coordinate of the bottom-left corner from the sketch and then beautifies the left line segment. Next, the algorithm computes the y coordinate of the top-right corner from the y coordinate of the top-left corner (based on the top line segment having the horizontal slope constraint), and then the x coordinate of the top-right corner from the two left corners (based on the equal length constraint between the top and left line segments), and then beautifies the top line segment.

In a manner similar to the previous operation, the algorithm computes the y coordinate of the bottom-right corner from the y coordinate of the bottom-left corner (based on the bottom line segment having the horizontal slope constraint), and then the x coordinate of the bottom-right corner from the two left corners (based on the equal length constraint between the bottom and left line segments), and then beautifies the bottom line segment.

However, suppose that the SPS 102 failed to infer any equal length constraint involving the bottom line segment. The algorithm can still compute the x coordinate of the bottom-right corner from the x coordinate of the top-right corner (based on the right line segment having the vertical slope constraint). Next suppose that the SPS 102 also failed to infer the vertical slope constraint for the right line segment. The algorithm can still compute the slope of the right line segment from the slope of the top line segment (based on the perpendicular constraint between the top and right line segments), followed by computing the intercept of the right line segment from the x coordinate of the top-right corner. The algorithm can then compute the x coordinate of the bottom-right corner from the two top corners (based on of the equal length constraint between the right and top line segments). These instances of missing constraints highlight the robustness of the beautification algorithm, which is able to make up for the missing constraints by making effective use of other (logically equivalent) constraints.

A.4. Pattern Processing Module

Figure 9:
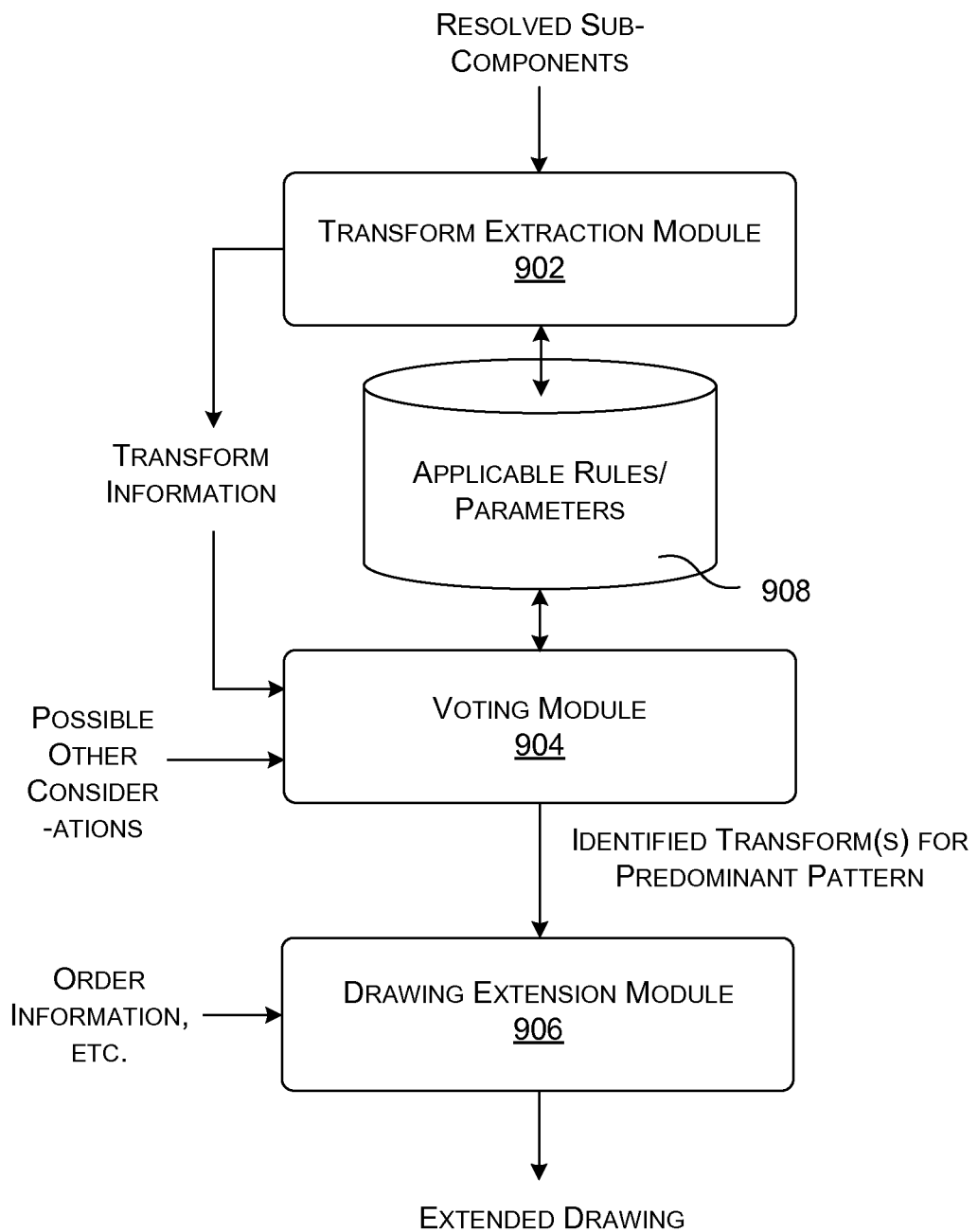
FIG. 9 shows one implementation of a pattern processing module that can be used in the SPS of FIG. 1.

FIG. 9 shows one implementation of a pattern processing module 114 that can be used in the SPS 102 of FIG. 1. As previously stated, the pattern processing module 114 determines whether there are any repeating patterns in the beautified drawing. If so, the pattern processing module 114 invites the user to add one or more new components to the beautified drawing using the detected pattern.

The pattern processing module 114 includes a transform extraction module 902 which receives, as input, all of the sub-components associated with the beautified drawing (which have all been resolved at this stage). The transform extraction module 902 processes each pair of the sub-components to determine a transformation that will convert the first member of the pair into the second member (or vice versa). This yields a plurality of transformations. That is, in the case in which there are n sub-components, the transform extraction module 902 produces $O(n^2)$ transformations. Collectively, this set of transformations is referred to as transformation information herein.

A voting module 904 then determines at least one transformation that is most common in the transformation information. This transformation(s) corresponds to a repeating pattern in the beautified drawing. A drawing extension module 906 then uses the determined pattern to add one or more new components to the beautified drawing.

A data store 908 provides an extensible and customizable set of rules which determine the manner of operation of the transform extraction module 902 and the voting module 904. For example, the rules can determine the way that the transform extraction module 902 expresses the transformation between the members of each pair of sub-components. In some implementations, for instance, the transformation extraction module 902 determines an affine transformation between the members of each pair of sub-components. The rules can also determine the type of voting technique that is used by the voting module 904 to assess the commonality of each detected transformation. In some implementations, the voting module 904 can form an un-weighted or weighted sum of the number of equivalent transformations that are encountered. In addition, the rules can define various parameter values used by the transform extraction module 902 and/or the voting module 904 to perform their respective functions.

Figure 10:
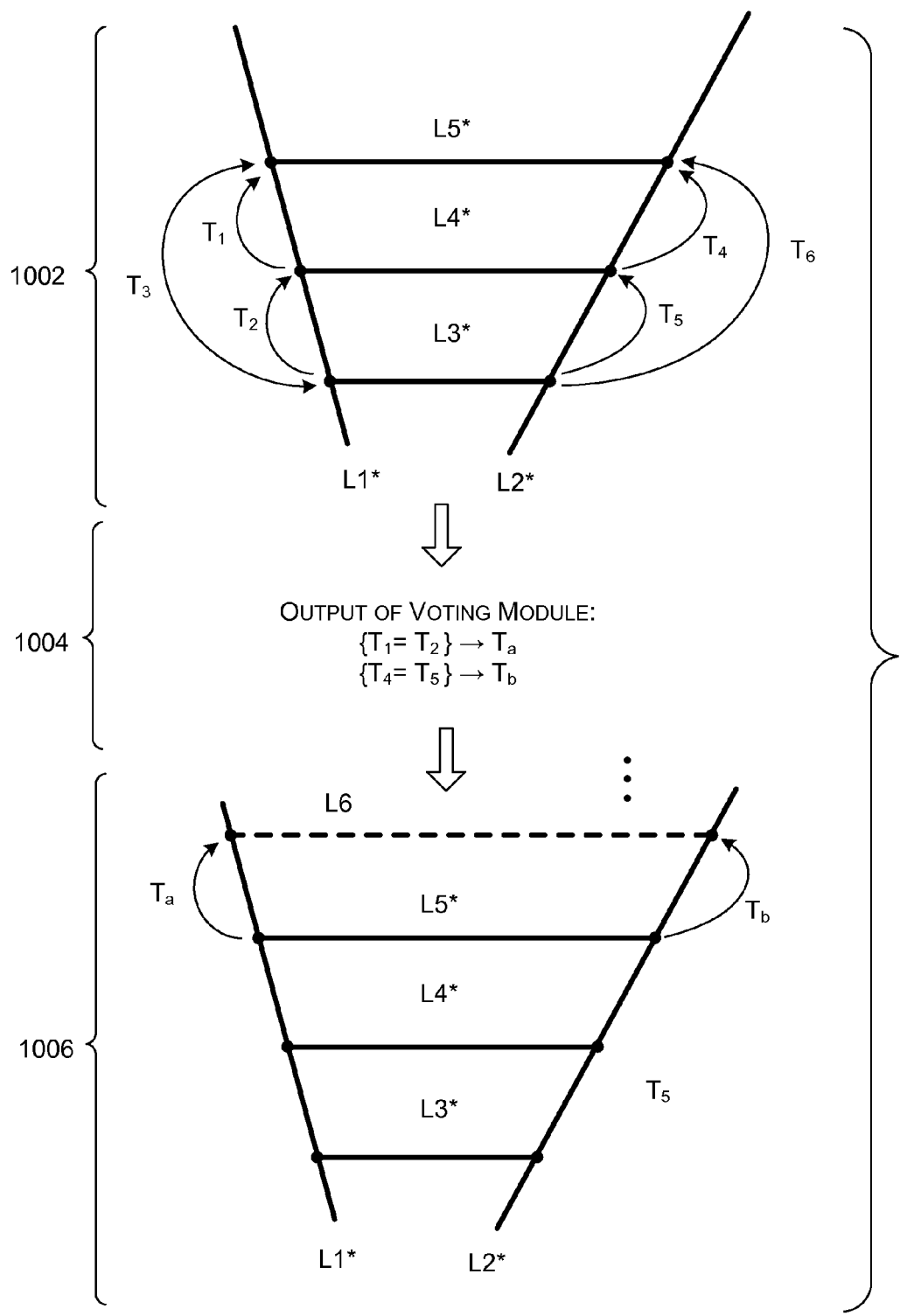
FIG. 10 shows an example of the operation of the pattern processing module of FIG. 9.
Figure 11:
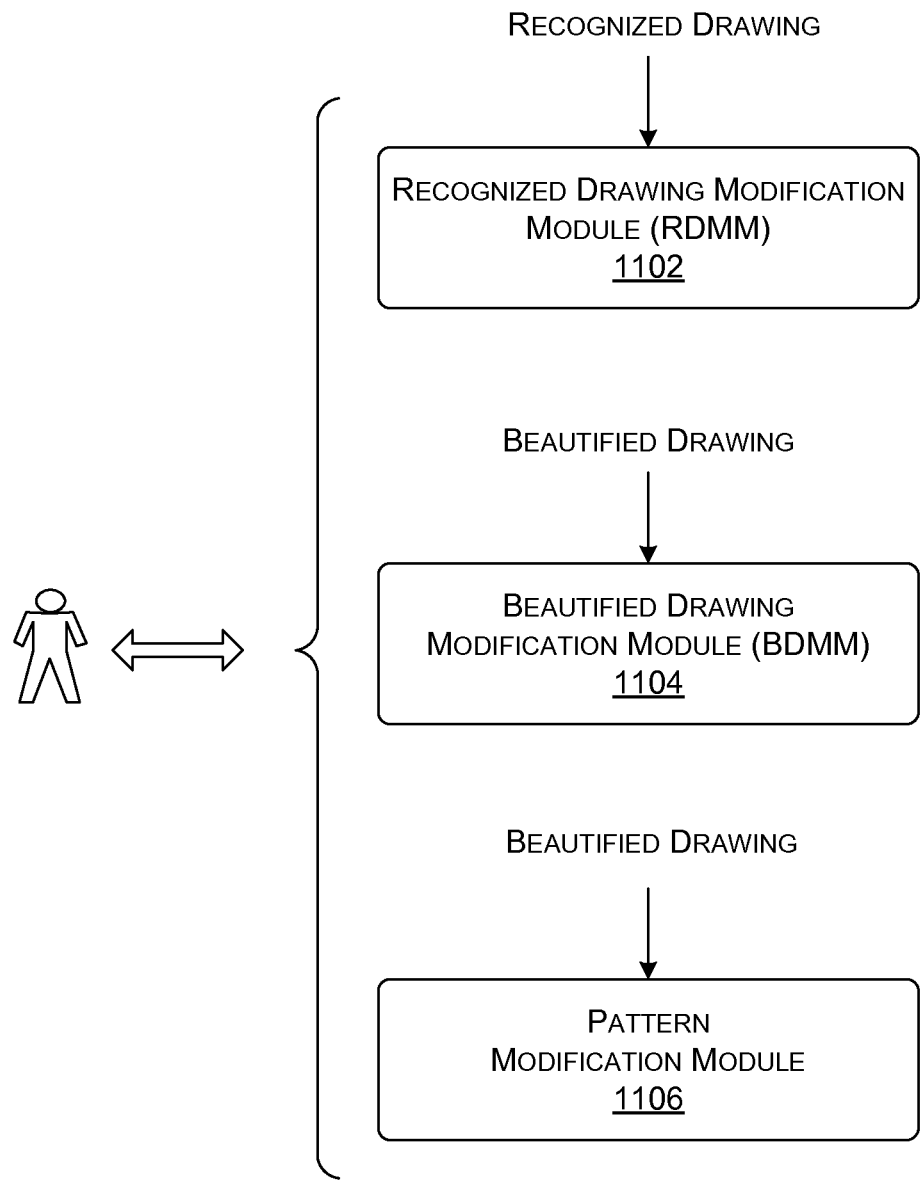
FIG. 11 shows one implementation of a user interaction module that can be used in the SPS of FIG. 1.

FIG. 10 shows an example of the operation of the pattern processing module 114 of FIG. 9, corresponding to the scenario introduced in FIG. 4. In phase 1002, the pattern processing module 114 can determine a plurality of transformations (e.g., transformations T1-T6) between pairs of endpoints in the ladder, where each endpoint is defined by x-y coordinates. More generally, the pattern processing module 114 can generate a transformation between any pair of sub-components (or any pair of sub-component-combinations) of any type (that is, not just endpoints defined by x-y coordinates). For example, the pattern processing module 114 can form a transformation based on intercept information, slope information, and so on (although the slope information will not yield meaningful information in the ladder example because the rungs have the same slope). In addition, although not illustrated, the pattern processing module 114 can consider any pair of endpoints in which the first endpoint is taken from the left side of the ladder and the second endpoint is taken from the right side of the ladder.

In phase 1004, the pattern processing module 114 identifies two prevalent transformations. A first transformation $T_a$ indicates that each endpoint on the left side of the ladder can be produced from its lower-adjacent neighbor by moving up a prescribed distance, and then over to the left a prescribed distance. Similarly, a second transformation $T_b$ indicates that each endpoint on the right side of the ladder can be produced from its lower-adjacent neighbor by moving up a prescribed distance, and then over to the right a prescribed distance. The horizontal displacement specified by $T_a$ may differ from the horizontal displacement specified by $T_b$. The pattern processing module 114 can also determine that these two transformations are part of the same higher-order pattern because they pertain to endpoints on either side of the same rungs.

In phase 1006, the pattern processing module 114 applies the two transformations ($T_a$ and $T_b$) to add at least one new component line L6 to the ladder. Note that each transformation ($T_a$ and $T_b$) can be separately expressed as an affine transformation, yet the progression in the width of the rung lines cannot be expressed with a single affine transformation. This example demonstrates that the pattern processing module 114 provides a versatile mechanism for determining different types of patterns within the beautified drawing; at the same time, the pattern processing module 114 can still leverage the efficiency and power of the affine transformation.

Other patterns can be expressed as a single transformation, such as the pattern exhibited in by the regular angular displacement of spokes in FIG. 3.

More generally stated, the principles described above can be applied to any objects within any drawing, originating from any source. In the above-described case, the objects happen to correspond to the sub-components within a beautified drawing produced by the recognition module 110 and the beautification module 112.

A.5. User Interaction Module

FIG. 10 shows one implementation of a user interaction module 118. The user interaction module 118 can include a recognized drawing modification module (RDMM) 1102 for making changes to the original drawing and/or the recognized drawing. The user interaction module 118 also includes a beautified drawing modification module (BDMM) 1104 for making changes to the beautified drawing. The user interaction module 118 can also include a pattern modification module 1106 for guiding the pattern processing module 114 in the selection of a pattern and in the placement of new components based on the selected pattern.

Figure 12:
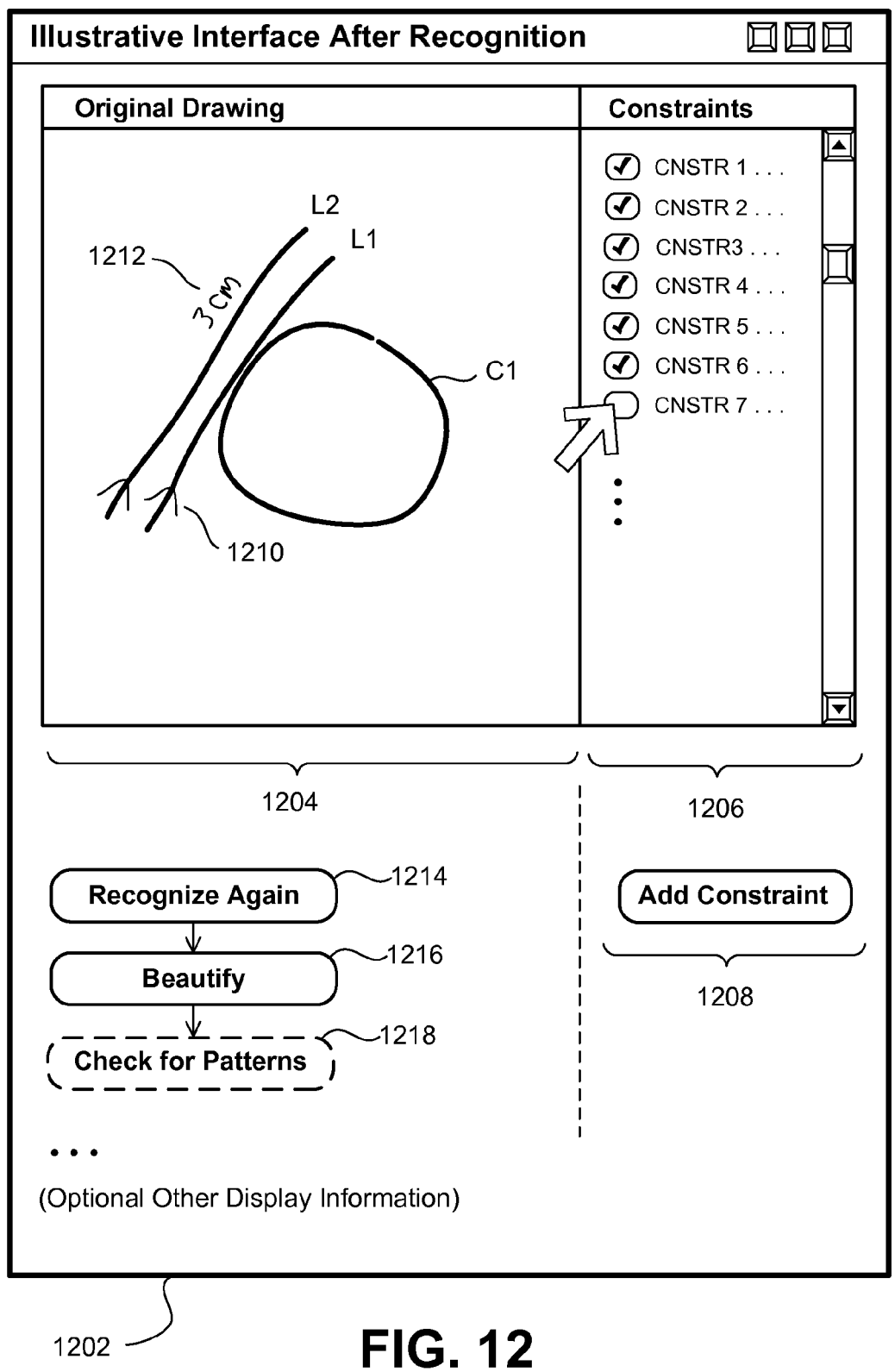
FIGS. 12-14 show three illustrative user interface presentations that can be produced by the user interaction module of FIG. 11.

FIG. 12 shows a user interface presentation 1202 that may be presented by the RDMM 1102. This user interface presentation 1202 can include a first display section 1204 for presenting a depiction of the original drawing as hand-drawn by the user. That drawing corresponds to the scenario of FIG. 2. That is, the drawing includes a line L1 which is intended to be parallel to another line L2; the line L1 is also intended to be tangent to a circle C.

The user interface presentation 1202 also includes a display section 1206 that displays all of the constraints that the recognition module 110 has recognized (illustrated in FIG. 12 in only generic form). This display section 1206 allows the user to review the accuracy of the constraints and modify the constraints in any manner. For example, the user can conclude that a constraint has been recognized that he or she did not intend. In response, the user can remove that constraint by clicking on its check box in the display section 1206 (in one merely illustrative user interface example).

In addition, or alternatively, a user can activate an "add constraint" command 1208 to add a new explicit constraint to the list of implicitly-recognized constraints. For example, the user can perform this task by selecting one or more components in the original or revised drawing. The user can then access a contextual menu which identifies a set of possible constraints that can be defined for this particular component or combination of components. The user can then select a desired constraint from that menu. Alternatively, the user can express a new constraint in entirely textual form, e.g., by expressing the components and constraints with appropriate symbols. The user can also modify any existing constraint in the same manner, e.g., by modifying its textual description.

In addition, or alternatively, the user can annotate the original drawing itself with markings that convey explicit constraints. For example, when creating the original drawing, the user has added a pair of arrow heads 1210 to lines L1 and L2. This marking indicates that these lines are intended to be parallel. The user has added another marking 1212 to indicate that the length of line L2 is 3 cm, e.g., by writing the text "3 cm" so that it is aligned in parallel with L2. These markings are described by way of example not limitation; other implementations can adopt other markings to convey other types of constraints. In any event, the recognition module 110 can include functionality for recognizing these hand-drawn explicit constraints. The recognition module 110 can then add these constraints to the list of implicitly-recognized constraints.

The user interface presentation 1202 can also include various commands (1214, 1216, 1218) that instruct the SPS 102 to commence (or repeat) different phases of analysis, such as the recognition phase, the beautification phase, and the pattern recognition phase. At this stage, the pattern recognition option is currently disabled because the user has not yet formed the beautified drawing. In an alternative implementation, the SPS 102 can automatically commence the beatification phase for each component once it deems it possible to fully resolve the sub-components in this component.

Although not shown, the user can also interact with a user interface presentation that is similar to that shown in FIG. 12 when creating the original drawing, that is, prior to any recognition being performed. For example, the user can use such a user interface presentation to add explicit constraints in any of the ways described above.

Figure 13:
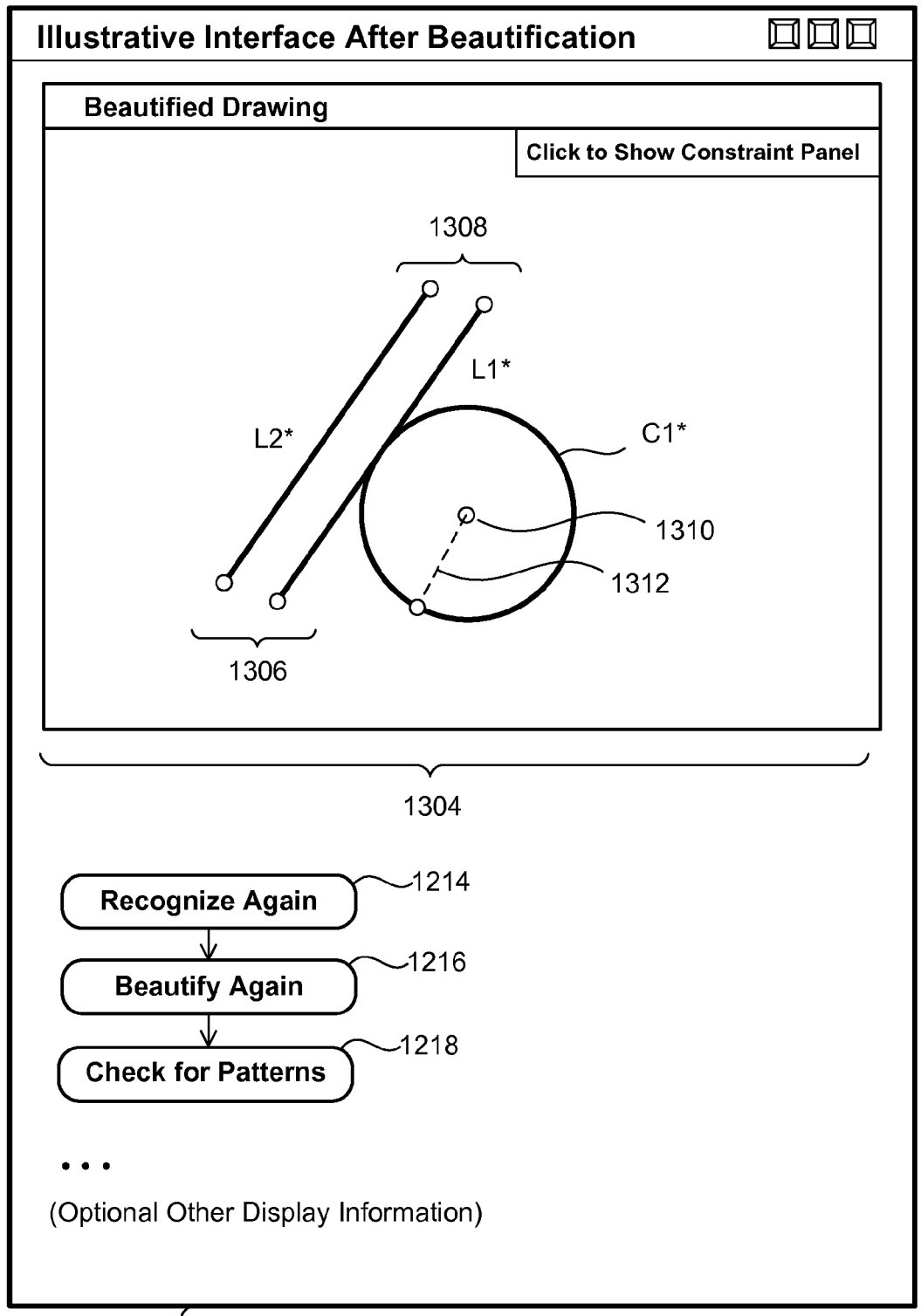

FIG. 13 shows a user interface presentation 1302 that may be presented by the BDMM 1104. This user interface presentation 1302 can include a first display section 1304 for presenting a depiction of the beautified drawing that corresponds to the original drawing shown in FIG. 12. At this stage, the BDMM 1104 may allow the user to adjust various aspects of the components in the beautified drawing. For example, the display section 1304 can display edit points (1306, 1308, 1310, 1312, etc.). The user can adjust the positions of these edit points (e.g., by dragging on them) to make corresponding desired changes to the components. Although not shown, the user can also modify constraints associated with the beautified drawing in same the manner described above with respect to FIG. 12.

Figure 14:
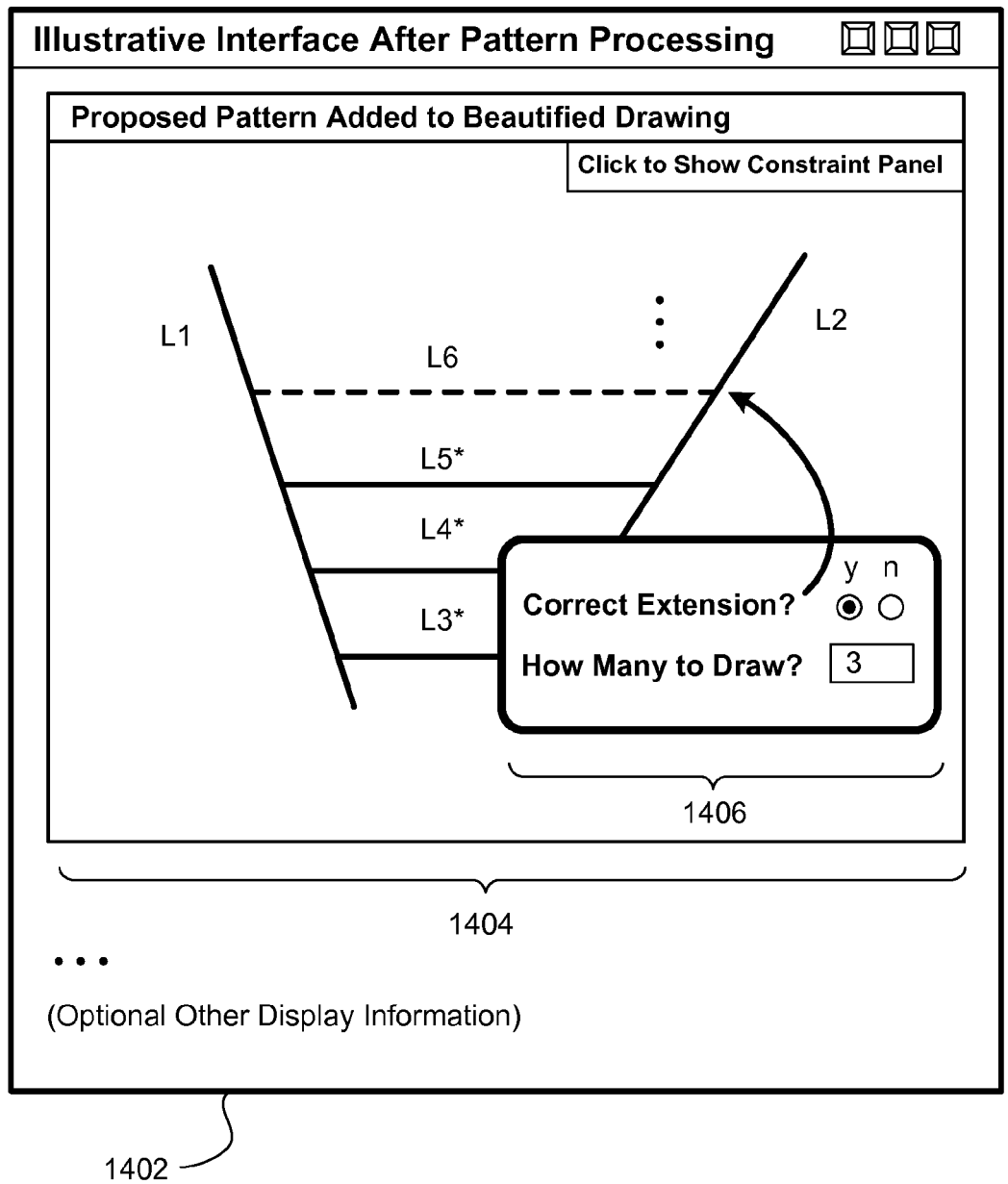

FIG. 14 shows a user interface presentation 1402 that may be presented by the pattern modification module 1106. This user interface presentation 1402 can include a first display section 1404 for presenting a depiction of a beautified drawing, in this case, corresponding to a ladder with increasing-width rungs introduced in FIG. 4. The user interface presentation 1402 also indicates that it has detected a pattern in the drawing that, when applied, will produce at least one new line L6. The pattern processing module 114 draws the line L6 on top of the line L5 based on the order in which the user has drawn lines L3-L5. That is, assume that the user drew L3 first, followed by line L4, followed by line L5. Based on this progression, the pattern processing module 114 can assume that the user intends to add a rung above line L5, not below line L3.

The pattern processing module 114 can also present a dialog box 1406 which asks the user to confirm that the indicated line L6 represents an instance of a correctly-detected recurring pattern in the drawing. The dialog box 1406 also invites the user to specify how many times that the pattern is to be applied to create new components. In this case, the user has instructed the pattern processing module 114 to add three new rungs.

B. Illustrative Processes

FIGS. 15-19 show procedures that explain one manner of operation of the sketch processing system (SPS) 102 of FIG. 1. Since the principles underlying the operation of the SPS 102 have already been described in Section A, certain operations will be addressed in summary fashion in this section.

Figure 15:
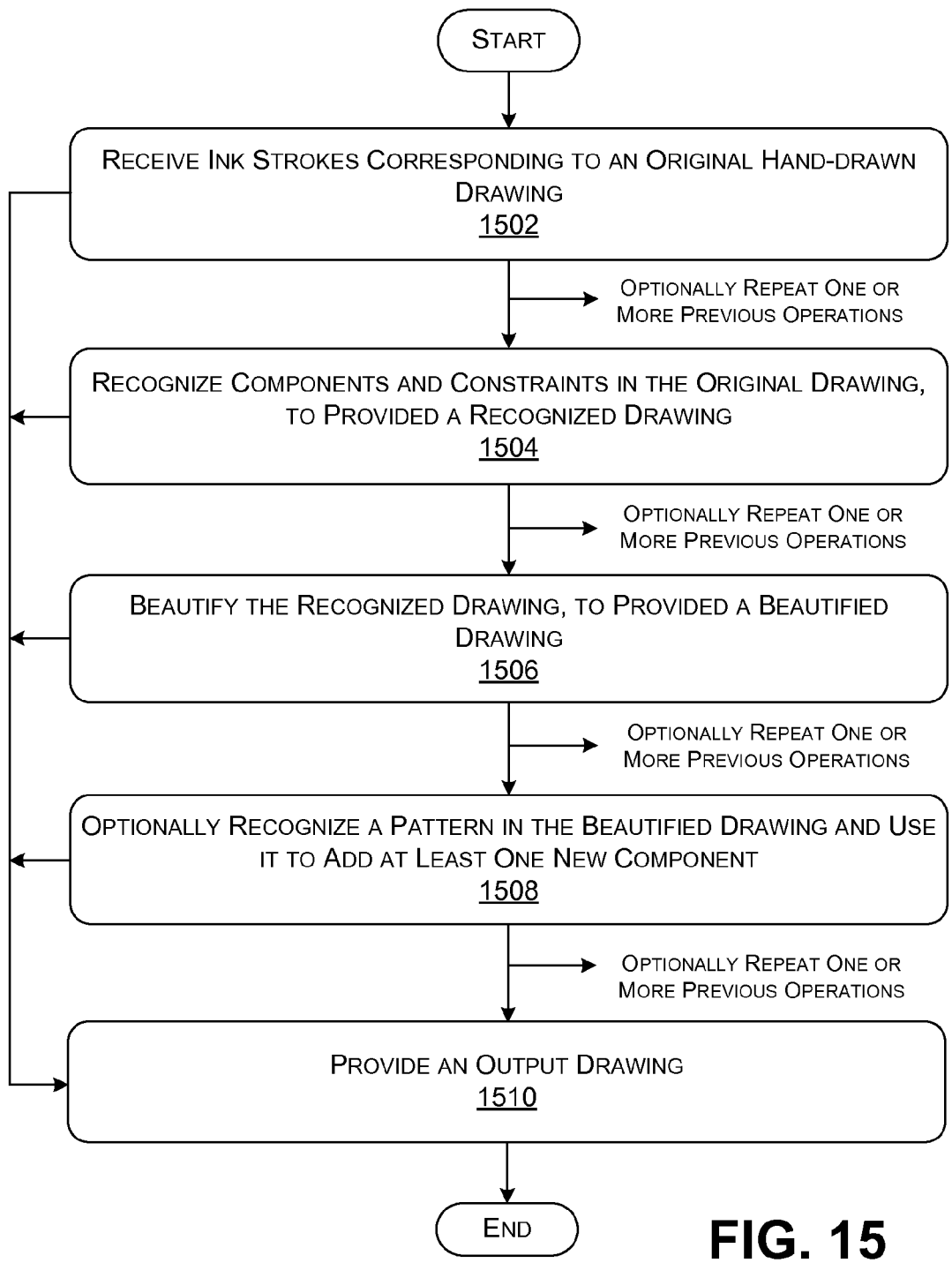
FIG. 15 is a procedure that provides an overview of one manner of operation of the SPS of FIG. 1.

Starting with FIG. 15, this figure illustrates a procedure 1500 that provides an overview of one manner of operation of the SPS 102 of FIG. 1. In block 1502, the SPS 102 receives ink strokes in response to creation of an original drawing. In block 1504, the SPS 102 recognizes components and constraints in the original drawing, to provide a recognized drawing. In block 1506, the SPS 102 beautifies the recognized drawing to produce a beautified drawing. In block 1508, the SPS 102 recognizes a pattern in the beautified drawing and adds a new component by applying this pattern. In block 1510, the SPS 102 provides an output drawing which reflects the processing performed in any of the preceding processing stages illustrated in FIG. 15. FIG. 15 also indicates that the SPS 102 can interact with a user to control various aspects of the operation of the SPS 102, e.g., by repeating one or instances of the drawing operation, the recognition operation, the beautification operation, and the pattern-processing operation, etc.

Figure 16:
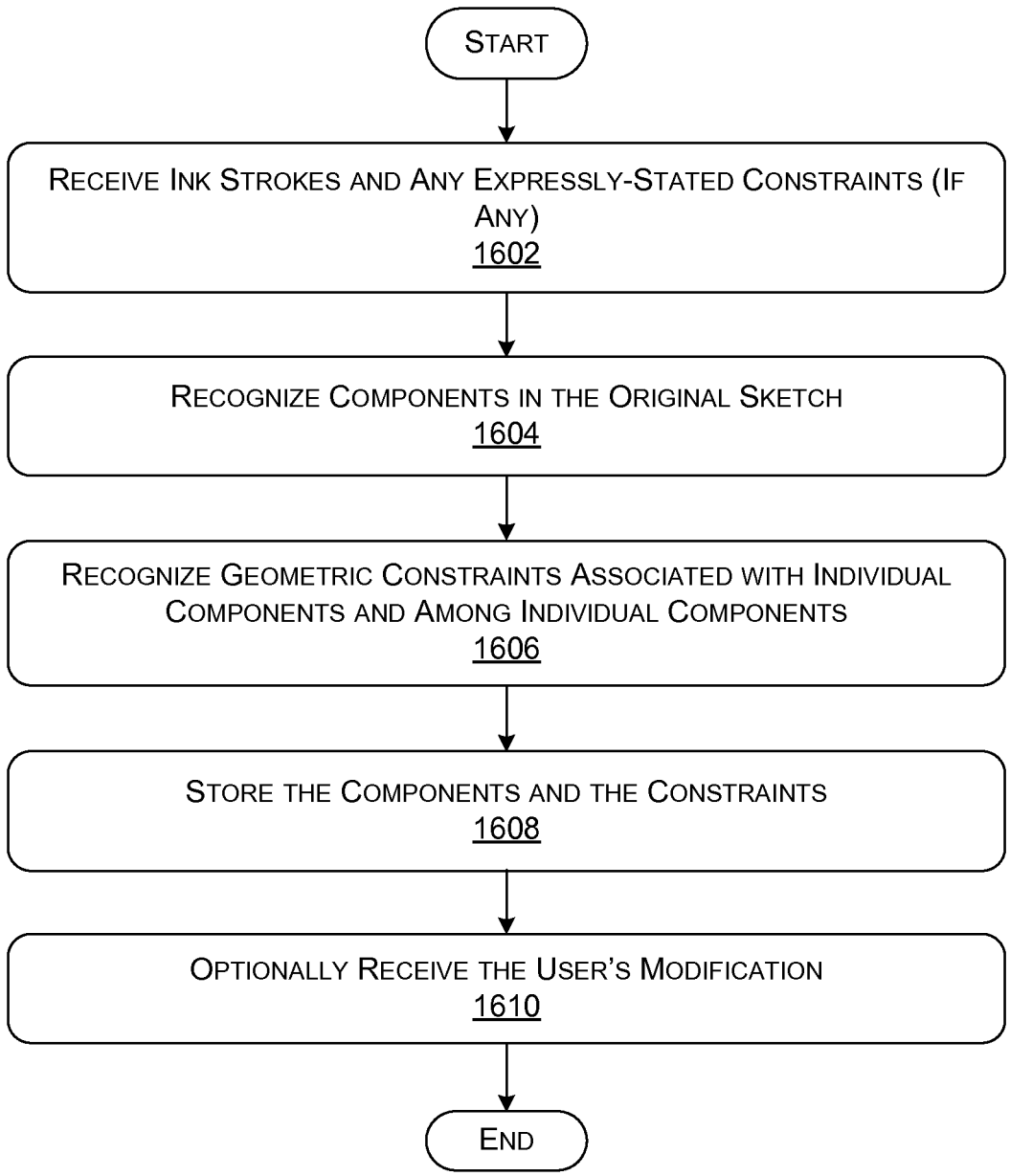
FIG. 16 is a procedure that describes one manner of operation of the recognition module of FIG. 6.

FIG. 16 is a procedure 1602 that describes one manner of operation of the recognition module 110 of FIG. 6. In block 1602, the recognition module 110 receives ink strokes and any explicitly-stated constraints specified by the user. In block 1604, the recognition module 110 recognizes components (e.g., lines and circles) in the original drawing. In block 1606, the recognition 110 recognizes geometric constraints associated with the components that were detected in block 1604. Blocks 1604 and 1606 can rely on rules provided in an extensible and customizable set of rules. In block 1608, the recognition module 110 stores the recognized components and constraints. In block 1610, the recognition module 110 can optionally receive and respond to the user's modification of the constraints and/or other features of the original drawing, e.g., using the functionality illustrated in FIG. 12.

Figure 17:
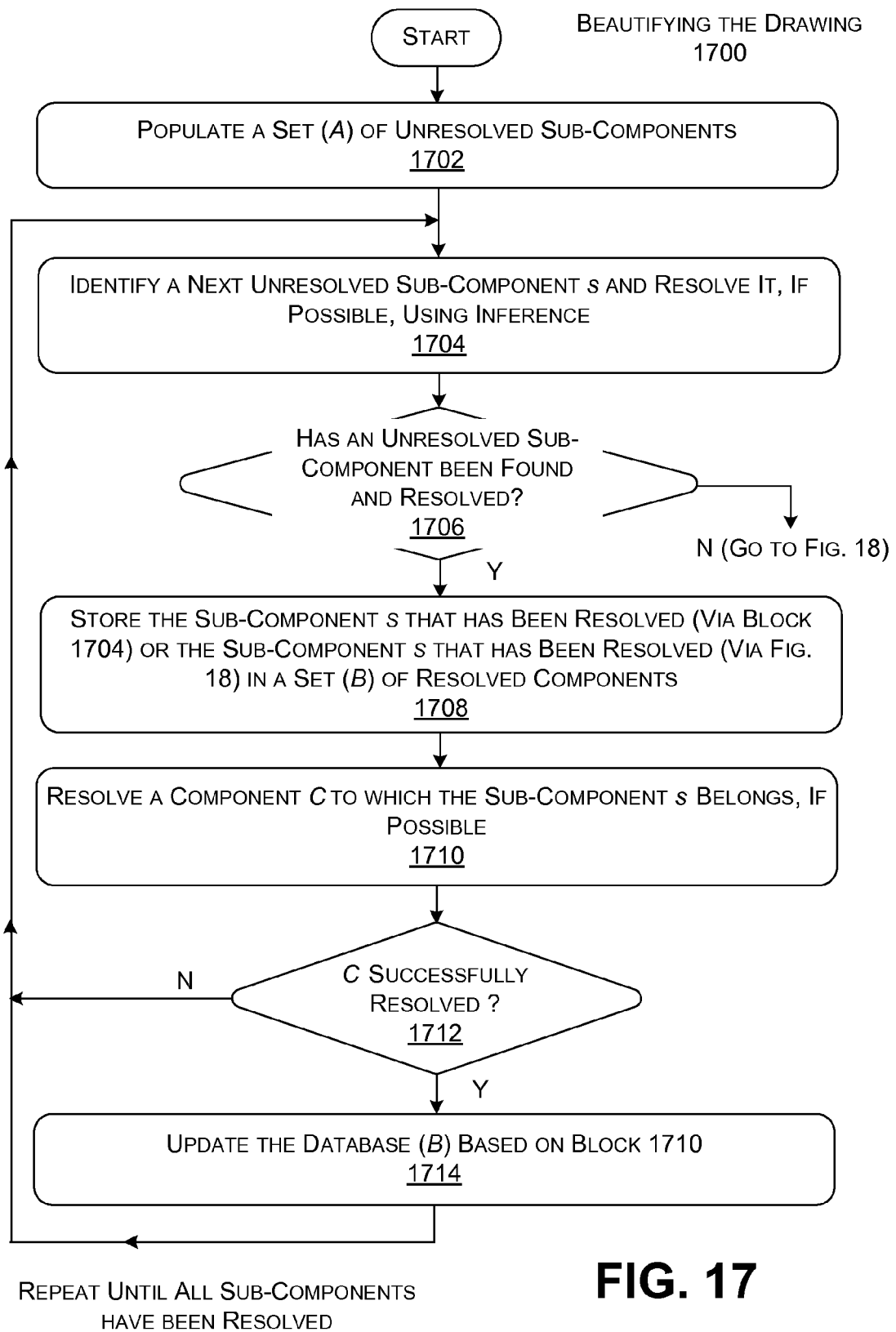
FIG. 17 is a procedure that describes one manner of operation of the beautification module of FIG. 7.

FIG. 17 is a procedure 1700 that describes one manner of operation of the beautification module 112 of FIG. 7. In block 1702, the beautification module 112 populates a set A to identify all of the unresolved sub-components associated with the recognized drawing. In block 1704, the beautification module 112 identifies a next (or first) unresolved sub-component to resolve. The beautification module 112 then resolves it if possible using inference, e.g., based on the previously resolved sub-components in the set B, the rules in the data store 716, etc. In block 1706, the beautification module 112 asks whether an unresolved sub-component has in fact been found and resolved in block 1704 using inference. If not, the beautification module 112 invokes the procedure of FIG. 18 (described below) to resolve a sub-component based on empirical information extracted from the original drawing. In block 1708, the beautification module 112 stores the sub-component that has been resolved (either by the operation of block 1706 or the procedure of FIG. 18) in a set B of resolved components.

In block 1710, the beautification module 112 determines whether it is possible to fully resolve a component C which is the parent of the sub-component s that has been just resolved. If this is possible, the beautification module 112 resolves the component C and each of the remaining unresolved sub-components of C. Upon a successful resolution (as assessed in block 1712), in block 1714, the beautification module 112 then updates the set B in the data store 716.

Figure 18:
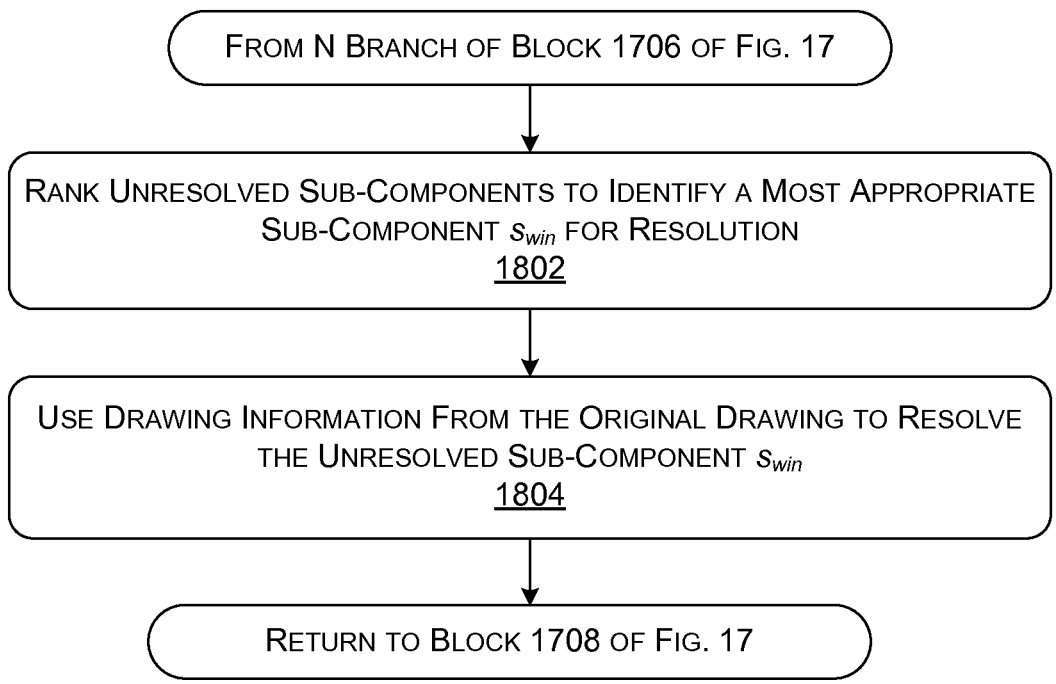
FIG. 18 is a procedure that describes one manner of operation of the component selection module of FIG. 8.

FIG. 18 shows a procedure 1800 that represents one manner of operation of the sub-component selection module 710 of FIG. 8, which is part of the beautification module 112. In one implementation, the sub-component selection module 710 is invoked when the beautification module 112 cannot find a sub-component that can be resolved based on the set B of previously-resolved sub-components (together with the constraints, and rules in the data store 714). In block 1802, the sub-component selection module 710 ranks unresolved sub-components based on the various factors described in Section A, to identify a selected sub-component $s_{win}$ that is considered most suitable for resolution. In block 1804, the component sub-selection module 710 extracts the value of the unresolved sub-component $s_{win}$ from the original drawing itself.

Figure 19:
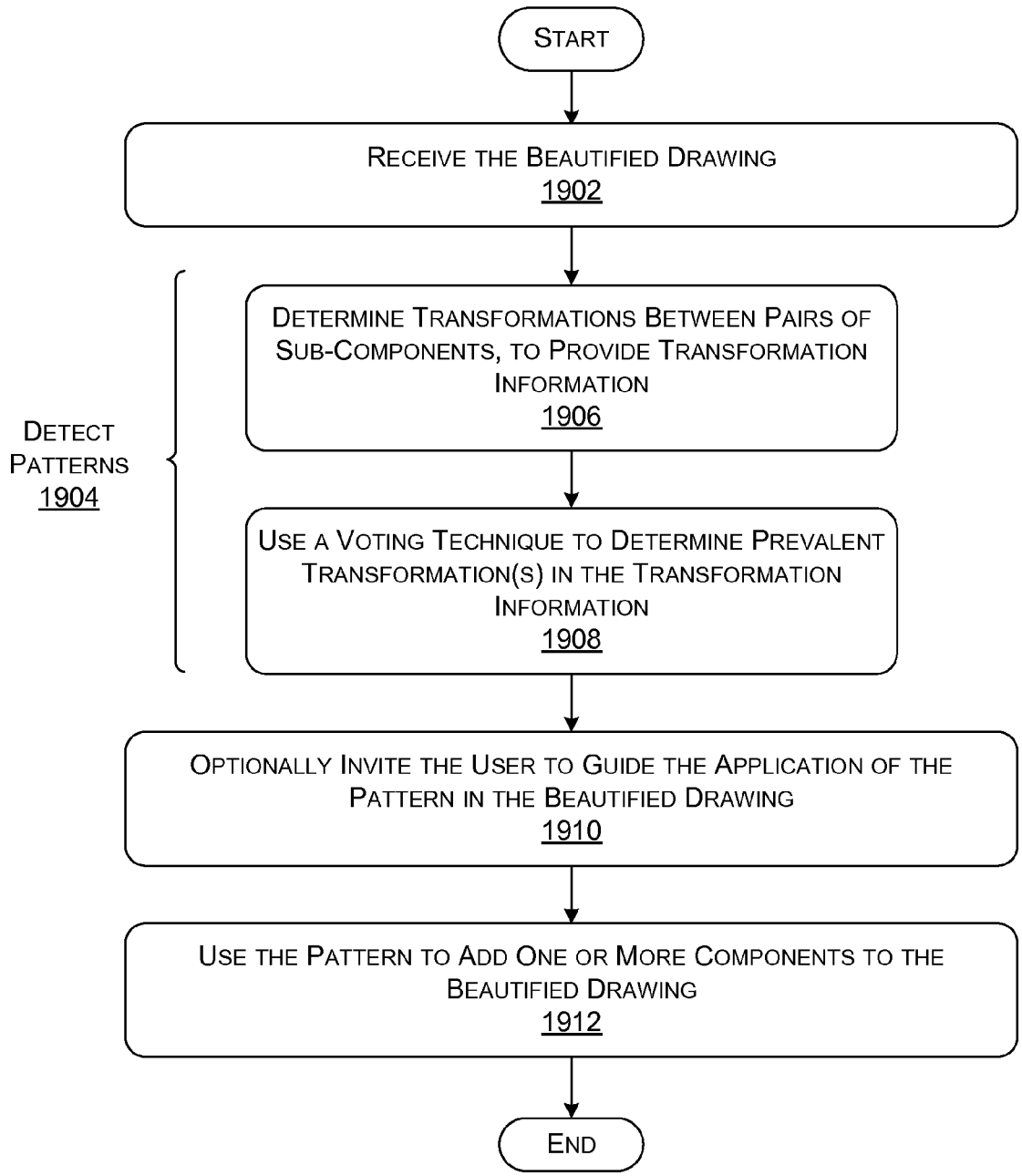
FIG. 19 is a procedure that describes one manner of operation of the pattern processing module of FIG. 9.

FIG. 19 is a procedure 1902 that describes one manner of operation of the pattern processing module 114 of FIG. 9. In block 1902, the pattern processing module 114 receives the beautified drawing from the beautification module 112. In block 1904, the pattern processing module 114 identifies a recurring pattern in the beautified drawing. More specifically, the pattern processing module 114 can perform block 1902 by determining transformations between pairs of sub-components in the beautified drawing (in block 1906). This, in general, yields transformation information. Then, in block 1908, the pattern processing module 114 uses a voting mechanism to identify the most common transformation or transformations in the transformation information.

In block 19010, the pattern processing module 114 optionally invites the user to authorize and direct the manner in which the pattern processing module 114 will modify the beautified drawing based on the detected pattern. In block 1912, the pattern processing module 114 adds at least one component to the beautified drawing based on the pattern that has been detected, and based on any user guidance provided in block 1910.

C. Representative Computing functionality

FIG. 20 sets forth illustrative computing functionality 2000 that can be used to implement any aspect of the functions described above. For example, the computing functionality 2000 can be used to implement any aspect of the sketch processing system (SPS) 102, e.g., as implemented in any of the implementations set forth in FIG. 5. In one case, the computing functionality 2000 may correspond to any type of computing device that includes one or more processing devices. In all cases, the computing functionality 2000 represents one or more physical and tangible processing mechanisms.

The computing functionality 2000 can include volatile and non-volatile memory, such as RAM 2002 and ROM 2004, as well as one or more processing devices 2006 (e.g., one or more CPUs, and/or one or more GPUs, etc.). The computing functionality 2000 also optionally includes various media devices 2008, such as a hard disk module, an optical disk module, and so forth. The computing functionality 2000 can perform various operations identified above when the processing device(s) 2006 executes instructions that are maintained by memory (e.g., RAM 2002, ROM 2004, or elsewhere).

More generally, instructions and other information can be stored on any computer readable medium 2010, including, but not limited to, static memory storage devices, magnetic storage devices, optical storage devices, and so on. The term computer readable medium also encompasses plural storage devices. In all cases, the computer readable medium 2010 represents some form of physical and tangible entity.

The computing functionality 2000 also includes an input/output module 2012 for receiving various inputs (via input modules 2014), and for providing various outputs (via output modules). One particular output mechanism may include a presentation module 2016 and an associated graphical user interface (GUI) 2018. The computing functionality 2000 can also include one or more network interfaces 2020 for exchanging data with other devices via one or more communication conduits 2022. One or more communication buses 2024 communicatively couple the above-described components together.

The communication conduit(s) 2022 can be implemented in any manner, e.g., by a local area network, a wide area network (e.g., the Internet), etc., or any combination thereof. The communication conduit(s) 2022 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, the description may have described various concepts in the context of illustrative challenges or problems.

This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by computing functionality, for assisting a user in producing a drawing comprising:
   receiving ink strokes in response to creation of an original drawing;
   recognizing components within the original drawing;
   recognizing constraints associated with the components that have been recognized, the components and the constraints yielding a recognized drawing;
   storing the components and the constraints in a data store;
   revising at least one aspect of the recognized drawing in accordance with the constraints to produce a beautified drawing;
   identifying a transformation between each pair of objects in the beautified drawing to produce transformation information, wherein the transformation is based on intercept information;
   identifying one or more predominant transformations in the transformation information that correspond to a predominant recurring pattern in the beautified drawing;
   adding an additional component in the beautified drawing based on the predominant recurring pattern; and
   providing an output drawing which is based on the beautified drawing.

2. The method of claim 1, wherein the components include at least one of:
   one or more lines; and
   one or more circles.

3. The method of claim 1, wherein each of said recognizing of components and said recognizing of constraints is based on at least one data store of rules that is both extensible and customizable.

4. The method of claim 1, wherein at least one constraint expresses a relationship between at least two components.

5. The method of claim 1, further comprising:
   displaying information regarding the constraints; and
   receiving at least one modification to the constraints from a user, to provide at least one explicit constraint.

6. The method of claim 1, further comprising recognizing a marking that appears in the original drawing, the marking being associated with at least one explicit constraint.

7. The method of claim 1, wherein identifying one or more predominant transformations comprises using a voting technique to identify one or more predominant transformations in the transformation information.

8. The method of claim 1, wherein said producing of the beautified drawing comprises parsing the components into a set of unresolved sub-components, each component being made up of two or more unresolved sub-components.

9. The method of claim 8, wherein said producing the beautified drawing further comprises iteratively performing operations of:
   determining whether an unresolved sub-component selected from the set of unresolved sub-components can be resolved based on a set of previously resolved sub-components, the constraints, and a data store of rules; and
   if the unresolved sub-component can be resolved, producing a corresponding resolved sub-component and adding the resolved sub-component to the set of previously resolved sub-components.

10. The method of claim 9, wherein, if an unresolved sub-component cannot be found that is able to be resolved, further comprising:
    identifying an unresolved sub-component that is deemed most appropriate for resolution, to provide a selected sub-component, the selected sub-component being associated with a parent component that is assessed as being most appropriate for resolution; and
    resolving the selected sub-component by making reference to drawing information in the original drawing, and updating the set of resolved sub-components based on said resolving of the selected sub-component.

11. The method of claim 10, wherein said identifying employs a ranking function that assigns a rank to each unresolved candidate sub-component based on: a weight assigned to a type of the candidate sub-component; a canonical order of a parent component to which the candidate sub-component belongs; and a weighted ratio of a number of resolved sub-components associated with the parent component to which the candidate sub-component belongs.

12. The method of claim 1, further comprising requesting user input to guide application of the predominant recurring pattern in the beautified drawing.

13. The method of claim 12, wherein adding an additional component in the beautified drawing comprises adding an additional component in the beautified drawing based on the predominant recurring pattern and the user input.

14. The method of claim 13, wherein each pair of objects comprises a pair of sub-components in the beautified drawing.

15. The method of claim 13, wherein said at least one prevalent transformation corresponds to two or more prevalent transformations.

16. The method of claim 13, wherein the transformation between each pair of objects is an affine transformation.

17. A device comprising:
    a processor; and
    executable instructions operable by the processor, the executable instructions comprising a method for assisting a user in producing a drawing, the method comprising:
      receiving ink strokes in response to creation of an original drawing;
      recognizing components and constraints within the original drawing, the components and the constraints yielding a recognized drawing;
      decomposing each component in the recognized drawing into two or more sub-components;
      successively resolving unresolved sub-components in the recognized drawing to produce a beautified drawing;
      identifying transformations between different pairs of sub-components in the beautified drawing to produce transformation information, wherein the transformations are based on slope information;
      identifying one or more predominant transformations in the transformation information that correspond to a predominant recurring pattern in the beautified drawing; and
      adding at least one additional component to the beautified drawing based on the predominant recurring pattern.

18. The device of claim 17, wherein successively resolving unresolved sub-components in the recognized drawing comprises ranking the unresolved sub-components and successively selecting the unresolved sub-components for resolution based on the rankings.

19. A method, performed by computing functionality, for assisting a user in producing a drawing comprising:
   receiving ink strokes in response to creation of an original drawing;
   recognizing components and constraints within the original drawing, the components and the constraints yielding a recognized drawing;
   decomposing each component in the recognized drawing into two or more sub-components;
   ranking unresolved sub-components in the recognized drawing;
   selecting one or more unresolved sub-components for resolution based on the rankings;
   resolving the selected sub-components in the recognized drawing to produce a beautified drawing;
   identifying transformations between different pairs of sub-components in the beautified drawing to produce transformation information, wherein the transformations are based on intercept information;
   identifying one or more predominant transformations in the transformation information that correspond to a predominant recurring pattern in the beautified drawing; and
   adding at least one additional component to the beautified drawing based on the predominant recurring pattern.

20. The method of claim 19, wherein identifying one or more predominant transformations comprises using a voting technique to identify one or more predominant transformations in the transformation information.

\* \* \* \* \*